United States Patent
Piekniewski et al.

(10) Patent No.: US 10,032,280 B2
(45) Date of Patent: Jul. 24, 2018

(54) APPARATUS AND METHODS FOR TRACKING SALIENT FEATURES

(71) Applicant: Brain Corporation, San Diego, CA (US)

(72) Inventors: Filip Piekniewski, San Diego, CA (US); Micah Richert, San Diego, CA (US); Dimitry Fisher, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 0 days.

(21) Appl. No.: 14/637,164

(22) Filed: Mar. 3, 2015

(65) Prior Publication Data

US 2016/0086051 A1    Mar. 24, 2016

Related U.S. Application Data

(60) Provisional application No. 62/053,004, filed on Sep. 19, 2014.

(51) Int. Cl.
*G06T 7/00*    (2017.01)
*G06K 9/32*    (2006.01)
(Continued)

(52) U.S. Cl.
CPC .......... *G06T 7/0065* (2013.01); *G06K 9/3241* (2013.01); *G06K 9/4623* (2013.01);
(Continued)

(58) Field of Classification Search
CPC ......... G06T 7/2006; G06T 2207/30241; G06T 7/0042; G06T 7/0081; G06T 7/408;
(Continued)

(56) References Cited

U.S. PATENT DOCUMENTS 5,063,603 A    11/1991 Burt
5,138,447 A    8/1992 Shen et al.
(Continued)

FOREIGN PATENT DOCUMENTS

CN    102226740 A    10/2011
JP    H0487423 A    3/1992
(Continued)

OTHER PUBLICATIONS

Berkes, et al., Slow feature analysis yields a rich repertoire of complex cell properties. Journal of Vision (2005) vol. 5 (6).
(Continued)

*Primary Examiner* — Kenny Cese
(74) *Attorney, Agent, or Firm* — Gazdzinski & Associates, PC

(57) ABSTRACT

Apparatus and methods for detecting and utilizing saliency in digital images. In one implementation, salient objects may be detected based on analysis of pixel characteristics. Least frequently occurring pixel values may be deemed as salient. Pixel values in an image may be compared to a reference. Color distance may be determined based on a difference between reference color and pixel color. Individual image channels may be scaled when determining saliency in a multi-channel image. Areas of high saliency may be analyzed to determine object position, shape, and/or color. Multiple saliency maps may be additively or multiplicative combined in order to improve detection performance (e.g., reduce number of false positives). Methodologies described herein may enable robust tracking of objects utilizing fewer determination resources. Efficient implementation of the methods described below may allow them to be used for example on board a robot (or autonomous vehicle) or a mobile determining platform.

22 Claims, 11 Drawing Sheets

US 10,032,280 B2

Page 2

(51) Int. Cl.
*G06K 9/46* (2006.01)
*G06T 7/20* (2017.01)
*H04N 9/797* (2006.01)
*G06K 9/48* (2006.01)
*G06T 7/246* (2017.01)
*G06T 7/90* (2017.01)

(52) U.S. Cl.
CPC ......... *G06K 9/4642* (2013.01); *G06K 9/4652* (2013.01); *G06K 9/48* (2013.01); *G06T 7/20* (2013.01); *G06T 7/246* (2017.01); *G06T 7/90* (2017.01); *H04N 9/7973* (2013.01); *G06K 9/4671* (2013.01); *G06T 2207/10024* (2013.01); *G06T 2207/20164* (2013.01); *G06T 2207/30241* (2013.01); *G06T 2215/16* (2013.01)

(58) Field of Classification Search
CPC ......... G06T 7/0065; G06T 7/20; G06T 7/246; G06T 7/90; G06T 7/215; G06K 9/3241; G06K 2009/3291; G06K 9/46; G06K 9/4652; G06K 9/4671; G06K 9/629; G06K 9/4642; G06K 9/4623; G06K 9/48; G06K 9/00664; H04N 9/7973
See application file for complete search history.

(56) References Cited

U.S. PATENT DOCUMENTS

| | | | |
|---|---|---|---|
| 5,216,752 A | 6/1993 | Tam | |
| 5,272,535 A | 12/1993 | Elabd | |
| 5,355,435 A | 10/1994 | Deyong et al. | |
| 5,638,359 A | 6/1997 | Peltola et al. | |
| 5,673,367 A | 9/1997 | Buckley | |
| 5,875,108 A | 2/1999 | Hoffberg et al. | |
| 6,009,418 A | 12/1999 | Cooper | |
| 6,014,653 A | 1/2000 | Thaler | |
| 6,035,389 A | 3/2000 | Grochowski et al. | |
| 6,359,601 B1 | 3/2002 | Maguire, Jr. | |
| 6,418,424 B1 | 7/2002 | Hoffberg et al. | |
| 6,458,157 B1 | 10/2002 | Suaning | |
| 6,501,515 B1 | 12/2002 | Iwamura | |
| 6,501,794 B1 | 12/2002 | Wang et al. | |
| 6,509,854 B1 | 1/2003 | Morita et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,556,610 B1 | 4/2003 | Jiang et al. | |
| 6,581,046 B1 | 6/2003 | Ahissar | |
| 6,625,317 B1 | 9/2003 | Gaffin et al. | |
| 6,678,590 B1 | 1/2004 | Burchfiel | |
| 7,016,783 B2 | 3/2006 | Hac et al. | |
| 7,113,867 B1 | 9/2006 | Stein | |
| 7,142,602 B2 | 11/2006 | Porikli et al. | |
| 7,430,682 B2 | 9/2008 | Carlson et al. | |
| 7,447,337 B2 | 11/2008 | Zhang et al. | |
| 7,580,907 B1 | 8/2009 | Rhodes | |
| 7,653,255 B2 | 1/2010 | Rastogi | |
| 7,737,933 B2 | 6/2010 | Yamano et al. | |
| 7,809,197 B2 | 10/2010 | Fedorovskaya et al. | |
| 7,849,030 B2 | 12/2010 | Ellingsworth | |
| 8,000,967 B2 | 8/2011 | Taleb | |
| 8,015,130 B2 | 9/2011 | Matsugu et al. | |
| 8,103,602 B2 | 1/2012 | Izhikevich | |
| 8,108,147 B1 | 1/2012 | Blackburn | |
| 8,160,354 B2 | 4/2012 | Paquier | |
| 8,200,593 B2 | 6/2012 | Guillen et al. | |
| 8,311,965 B2 | 11/2012 | Breitwisch et al. | |
| 8,315,305 B2 | 11/2012 | Petre et al. | |
| 8,390,707 B2 | 3/2013 | Yamashita | |
| 8,396,249 B1 | 3/2013 | Khosla et al. | |
| 8,396,282 B1 | 3/2013 | Huber et al. | |
| 8,416,847 B2 | 4/2013 | Roman | |
| 8,416,992 B2* | 4/2013 | Le Meur | G06K 9/4623 382/107 |
| 8,467,623 B2 | 6/2013 | Izhikevich et al. | |
| 8,542,875 B2 | 9/2013 | Eswara | |
| 8,712,939 B2 | 4/2014 | Szatmary et al. | |
| 9,070,285 B1 | 6/2015 | Ramu et al. | |
| 9,150,220 B2 | 10/2015 | Clarke et al. | |
| 9,713,982 B2 | 7/2017 | Buibas et al. | |
| 2002/0038294 A1 | 3/2002 | Matsugu | |
| 2002/0176025 A1 | 11/2002 | Kim et al. | |
| 2003/0050903 A1 | 3/2003 | Liaw et al. | |
| 2003/0216919 A1 | 11/2003 | Roushar | |
| 2004/0054964 A1 | 3/2004 | Bozdagi et al. | |
| 2004/0136439 A1 | 7/2004 | Dewberry et al. | |
| 2004/0170330 A1 | 9/2004 | Fogg et al. | |
| 2004/0193670 A1 | 9/2004 | Langan et al. | |
| 2004/0233987 A1 | 11/2004 | Porikli et al. | |
| 2005/0015351 A1 | 1/2005 | Nugent | |
| 2005/0036649 A1 | 2/2005 | Yokono et al. | |
| 2005/0047647 A1* | 3/2005 | Rutishauser | G06K 9/3233 382/159 |
| 2005/0062846 A1 | 3/2005 | Choi et al. | |
| 2005/0096539 A1 | 5/2005 | Leibig et al. | |
| 2005/0283450 A1 | 12/2005 | Matsugu et al. | |
| 2006/0008144 A1 | 1/2006 | Prasad et al. | |
| 2006/0088191 A1 | 4/2006 | Zhang et al. | |
| 2006/0094001 A1 | 5/2006 | Torre et al. | |
| 2006/0127042 A1 | 6/2006 | Park et al. | |
| 2006/0129728 A1 | 6/2006 | Hampel | |
| 2006/0161218 A1 | 7/2006 | Danilov | |
| 2006/0188168 A1 | 8/2006 | Sheraizin et al. | |
| 2006/0285724 A1* | 12/2006 | Tian | G06K 9/00335 382/103 |
| 2007/0003130 A1 | 1/2007 | Goerick et al. | |
| 2007/0022068 A1 | 1/2007 | Linsker | |
| 2007/0071100 A1 | 3/2007 | Shi et al. | |
| 2007/0109409 A1 | 5/2007 | Yea et al. | |
| 2007/0176643 A1 | 8/2007 | Nugent | |
| 2007/0208678 A1 | 9/2007 | Matsugu | |
| 2008/0043848 A1 | 2/2008 | Kuhn | |
| 2008/0100482 A1 | 5/2008 | Lazar | |
| 2008/0152236 A1 | 6/2008 | Vendrig et al. | |
| 2008/0174700 A1 | 7/2008 | Takaba | |
| 2008/0199072 A1 | 8/2008 | Kondo et al. | |
| 2008/0205764 A1* | 8/2008 | Iwai | G06K 9/48 382/190 |
| 2008/0237446 A1 | 10/2008 | Oshikubo et al. | |
| 2008/0252723 A1 | 10/2008 | Park | |
| 2008/0267458 A1 | 10/2008 | Laganiere et al. | |
| 2009/0018696 A1 | 1/2009 | Goerick et al. | |
| 2009/0028384 A1 | 1/2009 | Bovyrin et al. | |
| 2009/0043722 A1 | 2/2009 | Nugent | |
| 2009/0096863 A1 | 4/2009 | Kim et al. | |
| 2009/0096927 A1 | 4/2009 | Camp, Jr. et al. | |
| 2009/0106030 A1 | 4/2009 | Den et al. | |
| 2009/0141938 A1 | 6/2009 | Lim et al. | |
| 2009/0195640 A1 | 8/2009 | Kim et al. | |
| 2009/0202114 A1* | 8/2009 | Morin | A63F 13/12 382/118 |
| 2009/0287624 A1 | 11/2009 | Rouat et al. | |
| 2009/0304231 A1* | 12/2009 | Lu | G06K 9/3233 382/103 |
| 2009/0312985 A1 | 12/2009 | Eliazar | |
| 2009/0323809 A1 | 12/2009 | Raveendran | |
| 2010/0036457 A1 | 2/2010 | Sarpeshkar et al. | |
| 2010/0073371 A1 | 3/2010 | Ernst et al. | |
| 2010/0080297 A1 | 4/2010 | Wang et al. | |
| 2010/0081958 A1 | 4/2010 | She | |
| 2010/0086171 A1 | 4/2010 | Lapstun | |
| 2010/0100482 A1 | 4/2010 | Hardt | |
| 2010/0166320 A1 | 7/2010 | Paquier | |
| 2010/0225824 A1 | 9/2010 | Lazar et al. | |
| 2010/0235310 A1 | 9/2010 | Gage et al. | |
| 2010/0271511 A1 | 10/2010 | Ma et al. | |
| 2010/0290530 A1 | 11/2010 | Huang et al. | |
| 2010/0299296 A1 | 11/2010 | Modha et al. | |
| 2011/0002191 A1 | 1/2011 | Demaio et al. | |
| 2011/0016071 A1 | 1/2011 | Guillen et al. | |
| 2011/0063409 A1 | 3/2011 | Hannuksela | |

(56) References Cited

U.S. PATENT DOCUMENTS

| | | |
|---|---|---|
| 2011/0103480 A1 | 5/2011 | Dane |
| 2011/0119214 A1 | 5/2011 | Breitwisch et al. |
| 2011/0119215 A1 | 5/2011 | Elmegreen et al. |
| 2011/0134242 A1 | 6/2011 | Loubser et al. |
| 2011/0137843 A1 | 6/2011 | Poon et al. |
| 2011/0160741 A1 | 6/2011 | Asano et al. |
| 2011/0170792 A1 | 7/2011 | Tourapis et al. |
| 2011/0206122 A1 | 8/2011 | Lu et al. |
| 2011/0222603 A1 | 9/2011 | Le et al. |
| 2011/0228092 A1 | 9/2011 | Park |
| 2011/0242341 A1 | 10/2011 | Agrawal et al. |
| 2011/0280300 A1 | 11/2011 | Tourapis et al. |
| 2012/0011090 A1 | 1/2012 | Tang et al. |
| 2012/0026304 A1 | 2/2012 | Kawahara |
| 2012/0057634 A1 | 3/2012 | Shi et al. |
| 2012/0072189 A1 | 3/2012 | Bullen et al. |
| 2012/0083982 A1 | 4/2012 | Bonefas et al. |
| 2012/0084240 A1 | 4/2012 | Esser et al. |
| 2012/0093402 A1 | 4/2012 | Staelin et al. |
| 2012/0109866 A1 | 5/2012 | Modha |
| 2012/0130566 A1 | 5/2012 | Anderson et al. |
| 2012/0140032 A1 | 6/2012 | Tabor |
| 2012/0162450 A1 | 6/2012 | Park et al. |
| 2012/0212579 A1 | 8/2012 | Froejdh et al. |
| 2012/0230580 A1 | 9/2012 | Knee |
| 2012/0236114 A1 | 9/2012 | Chang et al. |
| 2012/0243733 A1 | 9/2012 | Sawai |
| 2012/0256941 A1 | 10/2012 | Ballestad et al. |
| 2012/0294486 A1 | 11/2012 | Diggins et al. |
| 2012/0294546 A1 | 11/2012 | Sakamoto et al. |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330447 A1 | 12/2012 | Gerlach et al. |
| 2013/0019024 A1 | 1/2013 | Sheth et al. |
| 2013/0022111 A1 | 1/2013 | Chen et al. |
| 2013/0050574 A1* | 2/2013 | Lu .................. G06K 9/00751 348/441 |
| 2013/0051680 A1* | 2/2013 | Kono .................. G06T 7/0081 382/195 |
| 2013/0073484 A1 | 3/2013 | Izhikevich et al. |
| 2013/0073491 A1 | 3/2013 | Izhikevich et al. |
| 2013/0073492 A1 | 3/2013 | Izhikevich et al. |
| 2013/0073495 A1 | 3/2013 | Izhikevich et al. |
| 2013/0073496 A1 | 3/2013 | Szatmary et al. |
| 2013/0073498 A1 | 3/2013 | Izhikevich et al. |
| 2013/0073499 A1 | 3/2013 | Izhikevich et al. |
| 2013/0073500 A1 | 3/2013 | Szatmary et al. |
| 2013/0147915 A1 | 6/2013 | Wiegand et al. |
| 2013/0148882 A1 | 6/2013 | Lee |
| 2013/0151450 A1 | 6/2013 | Ponulak |
| 2013/0176430 A1* | 7/2013 | Zhu .................. G06T 7/2053 348/143 |
| 2013/0218821 A1 | 8/2013 | Szatmary et al. |
| 2013/0222534 A1 | 8/2013 | Rusanovskyy et al. |
| 2013/0226532 A1 | 8/2013 | Ben et al. |
| 2013/0251278 A1 | 9/2013 | Izhikevich et al. |
| 2013/0297539 A1 | 11/2013 | Piekniewski et al. |
| 2013/0297541 A1 | 11/2013 | Piekniewski et al. |
| 2013/0297542 A1 | 11/2013 | Piekniewski et al. |
| 2013/0325766 A1 | 12/2013 | Petre et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2013/0325777 A1 | 12/2013 | Petre et al. |
| 2013/0343610 A1 | 12/2013 | Dal et al. |
| 2014/0003711 A1 | 1/2014 | Ngan et al. |
| 2014/0012788 A1 | 1/2014 | Piekniewski |
| 2014/0016858 A1 | 1/2014 | Richert |
| 2014/0028793 A1 | 1/2014 | Wiegand et al. |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0064609 A1 | 3/2014 | Petre et al. |
| 2014/0085507 A1 | 3/2014 | Pillman et al. |
| 2014/0086486 A1 | 3/2014 | Pillman et al. |
| 2014/0119654 A1 | 5/2014 | Taylor et al. |
| 2014/0122397 A1 | 5/2014 | Richert et al. |
| 2014/0122398 A1 | 5/2014 | Richert |
| 2014/0122399 A1 | 5/2014 | Szatmary et al. |
| 2014/0124004 A1 | 5/2014 | Rosenstein et al. |
| 2014/0156574 A1 | 6/2014 | Piekniewski et al. |
| 2014/0201126 A1 | 7/2014 | Zadeh et al. |
| 2014/0241612 A1 | 8/2014 | Rhemann et al. |
| 2014/0328405 A1 | 11/2014 | Shen et al. |
| 2014/0379179 A1 | 12/2014 | Goossen et al. |
| 2015/0077639 A1* | 3/2015 | Chamaret .......... H04N 1/6075 348/708 |
| 2015/0127154 A1 | 5/2015 | Passot et al. |
| 2015/0127155 A1 | 5/2015 | Passot et al. |
| 2015/0181168 A1* | 6/2015 | Pahalawatta .......... H04N 19/80 348/14.12 |
| 2015/0217449 A1 | 8/2015 | Meier et al. |
| 2015/0269439 A1* | 9/2015 | Versace ............. G06K 9/00664 382/103 |
| 2015/0281715 A1 | 10/2015 | Lawrence et al. |
| 2015/0304634 A1 | 10/2015 | Karvounis |
| 2015/0304640 A1 | 10/2015 | Brooks |
| 2015/0312547 A1 | 10/2015 | Cucca |
| 2016/0003946 A1 | 1/2016 | Gilliland et al. |
| 2016/0007043 A1 | 1/2016 | Heo et al. |
| 2016/0009413 A1 | 1/2016 | Lee et al. |
| 2016/0165209 A1 | 6/2016 | Huang et al. |
| 2016/0182884 A1 | 6/2016 | Lin et al. |

FOREIGN PATENT DOCUMENTS

| | | |
|---|---|---|
| RU | 2108612 C1 | 4/1998 |
| RU | 2406105 C2 | 12/2010 |
| RU | 2424561 C2 | 7/2011 |
| WO | WO-2008083335 A2 | 7/2008 |
| WO | WO-2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the interne <a href="http://homepages.cwi.nl/~sbohte/publication/phdthesis.pdf">http://homepages.cwi.nl/~sbohte/publication/phdthesis.pdf<url: />.

Brette et al., Brian: a simple and flexible simulator for spiking neural networks, The Neuromorphic Engineer, Jul. 1, 2009, pp. 1-4, doi: 10.2417/1200906.1659.

Cessac et al. 'Overview of facts and issues about neural coding by spikes.' Journal of Physiology, Paris 104.1 (2010): 5.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Dorval et al. 'Probability distributions of the logarithm of interspike intervals yield accurate entropy estimates from small datasets.' Journal of neuroscience methods 173.1 (2008): 129.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Field, G.; Chichilnisky, E, Information Processing in the Primate Retina: Circuitry and Coding. Annual Review of Neuroscience, 2007, 30(1), 1-30.

Fiete, et al, Spike-Time-Dependent Plasticity and Heterosynaptic Competition Organize Networks to Produce Long Scale-Free Sequences of Neural Activity. Neuron 65, Feb. 25, 2010, pp. 563-576.

(56) References Cited

OTHER PUBLICATIONS

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Florian (2003), Biologically Inspired Neural Networks for the Control of Embodied Agents, Technical Report Coneural-03-03 Version 1.0 [online], Nov. 30, 2003 [retrieved on Nov. 24, 2014]. Retrieved from the Internet: <url:http: download?doi="10.1.1.216.4931-"&rep1&type="pdf"></url:http:>.

Foldiak, P. Learning invariance from transformation sequences. Neural Computation, 1991, 3(2), 194-200.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org />.

Gerstner et al. (1996) A neuronal learning rule for sub-millisecond temporal coding. Nature vol. 383 (6595) pp. 76-78.

Gewaltig et al.. 'NEST (Neural Simulation Tool)', Scholarpedia, 2007. pp. I-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Gluck, Stimulus Generalization and Representation in Adaptive Network Models of Category Learning [online], 1991 [retrieved on Aug. 24, 2013]. Retrieved from the Internet:<URL: http:// www.google.coinlurl ?sa-t&rct-j&q-Giuck+4)/022STIMULUS+GENERALIZATION+AND+REPRESENTATION+1N+ADAPTIVE+NETWORK+MODELS±0F+CATEGORY+LEARNING%22+ 1991.

Gollisch et al., 'Rapid neural coding in the retina with relative spike latencies.' Science 319.5866 (2008): 1108-1111.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Hopfield JJ (1995) Pattern recognition computation using action potential timing for stimulus representation.Nature 376: 33-36.

Izhikevich E.M. (2004) Which Model to Use for Cortical Spiking Neurons? IEEE Transactions on Neural Networks, 15:1063-1070.

Izhikevich E.M. (2006) Polychronization: Computation With Spikes. Neural Computation, 18:245-282.

Izhikevich, E,M. (2007) Dynamical Systems in Neuroscience: The Geometry of Excitability and Bursting, The MIT Press, 2007.

Izhikevich, E,M, et al. (2009), Polychronous Wavefront Computations. International Journal of Bifurcation and Chaos, 19:1733-1739.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Janowitz, M.K., et al., Excitability changes that complement Hebbian learning. Network, Computation in Neural Systems, 2006, 17 (1), 31-41.

Karbowski et al., 'Multispikes and Synchronization in a Large Neural Network with Temporal Delays', Neural Computation 12. 1573-1606 (2000).

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL:http://www-ee.uta.edu/eeweb/IP/Courses/SPR/Reference/ Khotanzad.pdf.

Knoblauch, et al., Memory Capacities for Synaptic and Structural Plasticity, Neural Computation 2009, pp, 1-45.

Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.

Laurent, 'The Neural Network Query Language (NNQL) Reference' [retrieved on Nov. 12, 2013]. Retrieved from the Internet: <ItURLhttps://code.google.com/p/ nnql/issues/detail?id=1>.

Lazar et a]. 'Multichannel time encoding with integrate-and-fire neurons.' Neurocomputing 65 (2005): 401-407.

Lazar et al. 'A video time encoding machine', in Proceedings of the 15th IEEE International Conference on Image Processing (ICIP '08 2008, pp. 717-720.

Lazar et al. 'Consistent recovery of sensory stimuli encoded with MIMO neural circuits.' Computational intelligence and neuroscience (2010): 2.

Masquelier, et al., Learning to recognize objects using waves of spikes and Spike Timing-Dependent Plasticity. Neural Networks (IJCNN), The 2010 International Joint Conference on DOI—10.1109/1JCNN.2010.5596934 (2010) pp. 1-8.

Masquelier, Timothee, 'Relative spike time coding and STOP-based orientation selectivity in the early visual system in natural continuous and saccadic vision: a computational model.' Journal of computational neuroscience 32.3 (2012): 425-441.

Meister, M.; Berry, M.J. The neural code of the retina, Neuron, 1999, 22, 435-450.

Meister, M, Multineuronal codes in retinal signaling. Proceedings of the National Academy of sciences. 1996, 93, 609-614.

Nichols, A Reconfigurable Computing Architecture for Implementing Artificial Neural Networks on FPGA, Master's Thesis, The University of Guelph, 2003, pp. 1-235.

Oster, M., et al., A Spike-Based Saccadic Recognition System, ISCAS 2007. IEEE International Symposium on Circuits and Systems, 2009, pp. 3083-3086.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu!viewdoc/download?doi=0.1.1.5.4346&rep-repl&type-pdf.

Rekeczky, et al., "Cellular Multiadaptive Analogic Architecture: A Computational Framework for UAV Applications." May 2004.

Revow, M., et al., 1996, Using Generative Models for Handwritten Digit Recognition, IEEE Trans. on Pattern Analysis and Machine Intelligence, 18, No. 6, Jun. 1996.

Sanchez, Efficient Simulation Scheme for Spiking Neural Networks. Doctoral Thesis. (Juiversita di Granada Mar. 28, 2008, pp. 1-104.

Sato et al., 'Pulse interval and width modulation for video transmission.' Cable Television, IEEE Transactions on 4 (1978): 165-173.

Schemmel, J., et al., Implementing synaptic plasticity in a VLSI spiking neural network model. In: Proceedings of the 2006Intemational Joint Conference on Neural Networks (IJCNN'06), IEEE Press (2006) Jul. 16-21, 2006, pp. 1-6 [online], [retrieved on Aug. 24, 2012]. Retrieved from the Internet <url:> Introduction</url:>.

Schnitzer, M.J., et al., Multineuronal Firing Patterns in the Signal from Eye to Brain. Neuron, 2003, 37, 499-511.

Serrano-Gotarredona, et al, "On Real-Time: AER 2-D Convolutions Hardware for Neuromorphic Spike-based Cortical Processing", Jul. 2008.

Simulink.RTM. model [online], [Retrieved on Dec. 10, 2013] Retrieved from <t:URL: http://www.mathworks.com/ products/simulink/index.html>.

(56) References Cited

OTHER PUBLICATIONS

Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).

Sjostrom et al., 'Spike-Timing Dependent Plasticity' Scholarpedia, 5(2):1362 (2010), pp. 1-18.

Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi%2F10.1371%2Fjournal,pcbi.1000879<url:></url:>.

Thomas, S., et al, (2004), Realistic Modeling of Simple and Complex Cell Tuning in the HMAX Model, and Implications for Invariant Object Recognition in Cortex, AI Memo 2004-017 Jul. 2004.

Thorpe S.; Ultra-Rapid Scene Categorization with a Wave of Spikes. In H,H. Bulthoff et al. (eds.), Biologically Motivated Computer Vision, Lecture Notes in Computer Science, 2002, 2525, pp. 1-15, Springer-Verlag, Berlin.

Thorpe, S.J., et al. (2001), Spike-based strategies for rapid processing. Neural Networks 14, pp. 715-725.

Thorpe, S.J., et al. (2004), SpikeNet: real-time visual processing with one spike per neuron, Neurocomputing, 58-60, pp. 857-864.

Van Rullen, et al. (2003), Is perception discrete or continuous? Trends in Cognitive Sciences 7(5), pp. 207-213.

Van Rullen, R., et al (2005), Spike times make sense. Trends in Neurosciences 28(1).

Van Rullen R., et al., Rate Coding versus temporal order coding: What the Retinal ganglion cells tell the visual cortex. Neural computation, 2001, 13, 1255-1283.

Wallis, G., et al., A model of invariant object recognition in the visual system, Progress in Neurobiology. 1997, 51, 167-194.

Wang 'The time dimension for scene analysis.' Neural Networks, IEEE Transactions on 16.6 (2005): 1401-1426.

Wiskott, L., et al., Slow feature analysis: Unsupervised learning of invariances, Neural Computation, 2002, 14, (4), 715-770.

Wysoski et al, "Fast and Adaptive Network of Spiking Neuron for Multi-view Visual Pattern Recognition", May 3, 2008, Elsevier,Neurocomputing vol. 71, pp. 2563-2575.

Zarandy, et al., "Bi-i: A Standalone Ultra High Speed Cellular Vision System." In: [online]. Dated Jun. 13, 2005 (Jun. 13, 2005). Retrieved on Aug. 16, 2012 (Aug. 16, 2012). Retrieved from the Internet at URL:http://ieeexplore.ieee.orgixplilogin.jsp?tp=tarnumber=14387388turl=http%3A%2Fieeexplore.ieee.org%2Fxpls%2Fabs_all.jsp% Farnumber%3D1438738 <http:login.jsp?tp="&amumber=1438738 &url=http%3A%2F%2Fiee"></http:>.

Paugam-Moisy et al., "Computing with spiking neuron networks," G. Rozenberg T. Back, J. Kok (Eds.), Handbook of Natural Computing, Springer-Verlag (2010) [retrieved Dec. 30, 2013], [retrieved online from link.springer.com].

* cited by examiner

APPARATUS AND METHODS FOR TRACKING SALIENT FEATURES

PRIORITY CLAIM AND CROSS-REFERENCE TO RELATED APPLICATIONS

This application claims priority to co-owned U.S. Provisional Patent Application Ser. No. 62/053,004 entitled "SYSTEMS AND METHODS FOR TRACKING OBJECTS USING SALIENCY", filed Sep. 19, 2014, which is incorporated herein by reference in its entirety. This application is related to co-owned U.S. patent application Ser. No. 13/548,071, entitled "SPIKING NEURON NETWORK SENSORY PROCESSING APPARATUS AND METHODS", filed on Jul. 12, 2012, now U.S. Pat. No. 8,977,582, and co-owned U.S. patent application Ser. No. 13/660,982, entitled "SPIKING NEURON SENSORY PROCESSING APPARATUS AND METHODS FOR SALIENCY DETECTION", filed on Oct. 25, 2012, now U.S. Pat. No. 9,218,563, each of the foregoing incorporated herein by reference in its entirety. This application is also related to co-owned U.S. patent application Ser. No. 14/637,138 entitled "SALIENT FEATURES TRACKING APPARATUS AND METHODS USING VISUAL INITIALIZATION", and Ser. No. 14/637,191 entitled "APPARATUS AND METHODS FOR SALIENCY DETECTION BASED ON COLOR OCCURRENCE ANALYSIS" issued as U.S. Pat. No. 9,870,617 on Jan. 16, 2018, each filed contemporaneously herewith on Mar. 3, 2015, each also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Field of the Disclosure

The present disclosure relates to, inter alia, computerized apparatus and methods for detecting features in sensory information.

Description of Related Art

Saliency is a term often used in psychophysics and neuroscience, where it may be defined as the ability to attract attention to a particular stimulus. In the visual modality, saliency may be attributed to objects or visual patterns. In primates, there are at least five general aspects of the visual scene which spontaneously attract attention (a phenomenon often called pop-out):
1. Color—a unique color surrounded by another color or colors (e.g., a red spot in sea of green) will involuntarily trigger attention.
2. Orientation—a bar of one orientation surrounded by bars of another orientation
3. Contrast (luminance)—an area characterized by large contrast (a bright thing mixed with very dark things)
4. Motion—an object moving in a different direction or speed that surroundings.
5. Faces—only for humans and some primates, image resembling a face The biological origin of this behavior is debated. One of the plausible mechanisms is local inhibitory interaction in visual cortex (and perhaps thalamus). Such inhibitory connections arise between neurons which represent things often co-occurring. For example, a segment of vertical line (observed by a spatially restricted receptive field of a neuron) is typically a fragment of a larger line. A color blob seen in a receptive field of a neuron is most often a fragment of a larger blob of the same color. Appearance of a feature (e.g., orientation) which is not expected in a given context (e.g., vertical line segment surrounded by a large number of horizontal lines) is statistically much more rare, therefore inhibitory connections for such occurrence are much weaker. In consequence, the response of a neuron representing such "unexpected features" is stronger, as the otherwise present inhibition is lacking.

From an evolutionary point of view, sensitivity to such unexpected stimuli is beneficial. It allows one to quickly detect anomalies in the visual scene, which often indicate behaviorally relevant information (e.g., a ripe, red fruit among green leaves, a dangerous predator hiding in the bushes).

SUMMARY

One aspect of the disclosure relates to a non-transitory computer-readable storage medium. In one implementation, the medium has instructions embodied thereon, the instructions being executable by a processing apparatus to perform a method of tracking an object in a sequence of images. In one variant, each of the images is comprised of pixels, and the method includes: identifying a salient area in an image of the sequence of images; and initializing an object tracking process based at least on the identifying the salient area.

In one variant, the initializing is configured to reduce a number of occurrences of false positives associated with detecting the object in a subsequent image of the plurality of images, as compared to detecting the object in the subsequent image in absence of the initializing. Individual pixels of the image of the sequence of images are characterized by e.g., one or more pixel characteristics (e.g., chromacity parameter); and the identifying the salient area comprises determining a saliency distribution of pixels of the image of the sequence of images based on at least one of the one or more pixel characteristics.

In a further variant, the determination of the saliency distribution comprises determining a spatial distribution of pixel color distance in the image, the pixel color distance being determined based at least on a distance measure between the chromaticity parameter of individual pixels of the image and a reference chromaticity.

In yet another variant of the medium, identifying the salient area in the image comprises: partitioning the image into a plurality of partitions, individual ones of the plurality of partitions comprising a plurality of adjacent pixels in a contiguous area; convolving individual ones of the plurality of partitions with one or more spatial filter masks to produce a plurality of convolution magnitudes, individual ones of the one or more spatial filters characterized by filter orientation; and determining the salient area corresponding to a least frequently occurring filter convolution magnitude above a threshold.

In another variant of the medium, the salient area is identified based at least on analysis of displacement of pixels of the image relative to pixels of a preceding image of the sequence of images. The analysis of displacement comprises e.g., determination of a motion map of pixels of the image, the motion map at least characterizing magnitude and direction of motion of pixels in the image associated with representation of the object; and the saliency map determination is configured based at least on an additional information related to motion of the object.

In yet another variant of the medium, the image of the sequence of images is obtained by a sensor configured to sample energy reflected from an environment; individual pixels of the image are characterized by a range channel corresponding to a range value between the sensor and a location within the environment; and the salient area is determined based at least on information related to a given range to the object and a comparison of range channel value associated with pixels in the salient area to the range to the object.

In some implementations, the method implemented by the medium may comprise determining a shape characteristic of the feature. The parameter may comprise the characteristic.

In some implementations, the characteristic may be configured to characterize a circularity of the feature.

Another aspect of the disclosure relates to a method of operating a robotic device.

Yet another aspect of the disclosure relates to a method of tracking an object in a sequence of images. The method may comprise: determining a saliency measure based on analysis of pixels of an image of the sequence of imaged; and providing the saliency measure to a tracking process, the tracking process configured to determine representation of the object in individual ones of the sequence of images.

In some implementations, the identity of the tracked salient object may be estimated via computation of color distance, such as between the pixels representing the salient object and a previously initialized color prototype.

In some implementations, the determination of the saliency measure may comprise determining orientation of the feature to initialize a color distance computation to maximize discriminability between the target and the background.

In some implementations, the method may comprise determining orientation saliency to initialize a tracker pick the salient object.

In some implementations, the method may comprise using distance saliency to initialize a tracker.

In some implementations, the method may comprise using color saliency to pick a number of object colors to maximize discriminability from the background.

Still another aspect of the disclosure relates to a controller of a robotic apparatus. The controller may comprise a sensor processing component configured to analyze sensor input. The sensor input analysis may be configured to: determine visual (e.g., color) saliency; initialize a tracking process using the color saliency; determine a salient feature; operate the tracking process to detect the feature; and communicate tracking information to a controller component configured to adjust trajectory of the robotic device in accordance with a characteristic of the feature.

In some implementations, the salient feature determination may be configured based on color saliency. The salient feature information may be automatically provided to the tracking process. The feature may comprise an object. The trajectory adjustment may be configured to reduce spatial separation between the object and the apparatus.

In some implementations, the controller may comprise a manipulator. The trajectory adjustment may comprise operating the manipulator to pick up the object.

Yet another aspect of the present disclosure relates to a robotic apparatus. In one embodiment, the robotic apparatus may be configured to track an object and include: a camera; and a non-transitory computer-readable apparatus including a storage medium having instructions contained therein, the instructions being configured to cause the robotic apparatus to, when executed: obtain a plurality of images via the camera while navigating a trajectory associated with a physical task; identify a salient area in a given image of the plurality of images, the identification of the salient area being based at least on a motion component associated with the object and a motion component associated with the robotic apparatus; initialize an object tracking process based at least on the identification of the salient area in the given image, the object tracking process including a detection of the object from the salient area; and adjust the trajectory associated with the physical task based on the detection of the object from the salient area.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
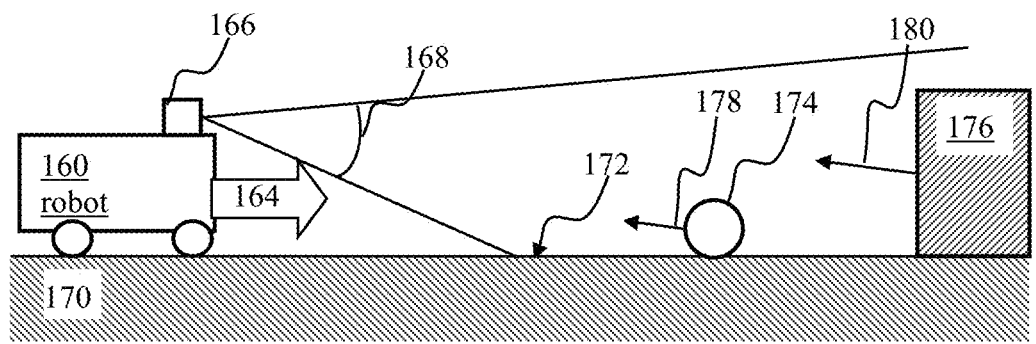
FIG. 1 is a graphical illustration depicting a robotic apparatus comprising an feature detection apparatus of the disclosure, configured for autonomous navigation, in accordance with one or more implementations.

All Figures disclosed herein are ©Copyright 2015 Brain Corporation. All rights reserved.

DETAILED DESCRIPTION

Implementations of the present disclosure will now be described in detail with reference to the drawings, which are provided as illustrative examples so as to enable those skilled in the art to practice the present technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet or "phablet" computers, portable navigation aids. J2ME equipped devices, smart TVs, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and other languages.

As used herein, the teems "connection", "link", "synaptic channel", "transmission channel", "delay line", are meant generally to denote a causal link between any two or more entities (whether physical or logical/virtual), which enables information exchange between the entities.

As used herein the term feature may refer to a representation of an object edge, determined by change in color, luminance, brightness, transparency, texture, and/or curvature. The object features may comprise, inter alia, individual edges, intersections of edges (such as corners), orifices, and/or curvature As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor", "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, and/or other FireWire implementation.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, and/or other cellular interface implementation) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the term "receptive field" is used to describe sets of weighted inputs from filtered input elements, where the weights may be adjusted.

As used herein, the term "Wi-Fi" refers to, without limitation, any of the variants of IEEE-Std. 802.11 or related standards including 802.11 a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other wireless interface implementation.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, RFID or NFC (e.g., EPC Global Gen. 2, ISO 14443, ISO 18000-3), satellite systems, millimeter wave or microwave systems, acoustic, and infrared (e.g., IrDA).

The present disclosure provides, among other things, apparatus and methods for determining salient features in sensor data. In some implementations, the sensor data may comprise images of a visual scene obtained using a video camera. The video information may comprise for example multiple streams of frames received from a plurality of cameras disposed separate from one another. Individual cameras may comprise an image sensor (e.g., charge-coupled device (CCD), CMOS device, and/or an active-pixel sensor (APS), photodiode arrays, and/or other sensors). In one or more implementations, the stream of frames may comprise a pixel stream downloaded from a file. An example of such a file may include a stream of matrices of red green blue RGB values (e.g., refreshed at a 25 Hz or other suitable frame rate). It will be appreciated by those skilled in the art when given this disclosure that the above-referenced image parameters are merely exemplary, and many other image representations (e.g., bitmap, luminance-chrominance (YUV, YCbCr), cyan-magenta-yellow and key (CMYK), grayscale, and/or other image representations) may be applicable to and useful with various implementations of the present disclosure. Furthermore, data frames corresponding to other (non-visual) signal modalities such as sonograms, infrared (IR), radar or tomography images may be compatible with the processing methodology of the disclosure, or yet other configurations.

The salient feature detections processing methodology described herein may enable a controller of a robotic device to detect targets and/or obstacles that may be present during trajectory navigation by the device, e.g., 160 of FIG. 1.

FIG. 1 depicts a mobile robotic apparatus comprising a feature detection apparatus configured, e.g., in accordance with the exemplary implementations illustrated below. The robotic apparatus 160 may comprise a camera 166. The camera 166 may be characterized by a field of view 168 (e.g., an extent of the observable world that may be captured by the camera lens at a given moment). The camera 166 may provide information associated with objects within the field of view 168. In some implementations, the camera 166 may provide frames of pixels of luminance and/or color, refreshed at 25 Hz frame rate. However, it will be appreciated that, in some implementations, other frame rates may be used (whether constant or variable), as may other types of information provided by the camera(s) 166.

One or more objects (e.g., a floor 170, a stationary object 176, a moving object (e.g., ball 174), and/or other objects) may be present in the camera field of view. The motion of the objects may result in a displacement of pixels representing the objects within successive frames, such as is described in co-owned U.S. patent application Ser. No. 13/689,717 filed on Nov. 29, 2012 and entitled "APPARATUS AND METHODS FOR OBJECT DETECTION VIA OPTICAL FLOW CANCELLATION", issued as U.S. Pat. No. 9,193,075 on Nov. 24, 2015, which is incorporated herein by reference in its entirety.

When the robotic apparatus 160 is in motion, such as shown by arrow 164 in FIG. 1, motion of the objects within the camera 166 field of view 168 (e.g., denoted by arrows 172, 178, 180 in FIG. 1) may comprise the self-motion component and the object motion component. By way of a non-limiting example, motion of objects in FIG. 1 may comprise apparent motion 180 of the stationary background 176 and the boundary (e.g., the component 172 associated with the floor boundary); (ii) component 178 associated with the moving ball 174 that comprises a superposition of the ball displacement and motion of the camera; and/or other components. As noted previously, determination of the ball 174 motion may be particularly challenging when the camera 160 is in motion (e.g., during panning) and/or when the field of view is changing (e.g., when zooming in/out).

Using relative aspects of an image may allow mitigation of detection problems that may arise due to lighting variance. For example, the absolute color of the object and/or background may vary widely depending on illumination, but relative saliency may be preserved. These aspects of saliency may make it a useful perceptual input to an autonomous robotic platform.

In some, implementations, the saliency of an item (such as an object, a person, a pixel, and/or other) may be described by a characteristic by which the item may stand out relative to its neighbors. Saliency may arise from, for instance, contrast between the item and its surroundings, such as a black object on a white background, or a rough scrape on a smooth surface. For example, a salient vehicle may comprise a vehicle that may be moving differently (e.g., going slower/faster than the rest of the traffic, weaving from lane to lane) compared to the rest of the traffic. A salient object for target approach may comprise a stationary and/or moving ball on a moving background due to self-motion by the vehicle.

Saliency may be determined in a number of ways by analyzing input images represented in one of the typical ways (e.g., grayscale, RGB, YUV, HSV, and/or other color models). In some implementations, an input may be characterized by a spatial extent (e.g., an image or array of pixels) and by color and/or luminance. Saliency may be determined based on a likelihood characterizing the input. By way of an illustration, for an image I comprising a plurality of pixels i(x,y), saliency at a pixel location (x,y) may be determined based on a likelihood of occurrence of the pixel value i in the image I. Lower likelihood may correspond greater the saliency at the location (x,y), in accordance with some implementations.

The saliency may be determined using a back projection of the image pixel likelihood information. In some implementations, the saliency of individual pixels of the image may be characterized by the number of pixels representing the same exact value in the rest of the image. For example an 8-bit image may comprise 300000 pixels having value of 128 and 1000 pixels carrying value of 0. For such image, less frequently occurring pixels (e.g., with the value of 0) may be referred to as more salient.

In some implementations, saliency may be determined using a model statistics approach. For instance, a model of expected pixel distribution may be utilized. Parameters of a given pixel distribution (e.g., Gaussian, Poisson, uniform), may be determined. In some implementations (e.g., of Gaussian distribution) the color distribution model may be characterized by two parameters, e.g., mean and a standard deviation. Pixel with values outside a given range (e.g., outside range [m−N1×stdev, m+N2×stdev] may be regarded as salient, where m denotes mean pixel value, stdev denotes standard deviation, N1, N2 denote multiplicative parameters (e.g. selected between value of 2 and value of 6). In some implementations (e.g., of Poisson distribution) the color distribution model may be characterized by one parameter, e.g., expected value/variance. Model of pixel color distribution may be determined based on analysis of one or more prior images and/or using an expected color distribution for a given scene (e.g., images of the sky, images of grass, and/or other environment).

Figure 2A:
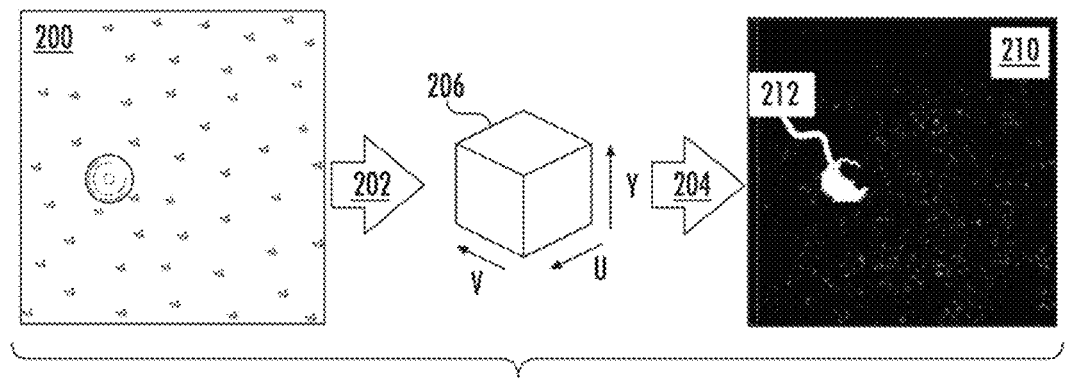
FIG. 2A illustrates use of pixel likelihood for feature detection in a YUV color space image, according to one or more implementations.
Figure 2B:
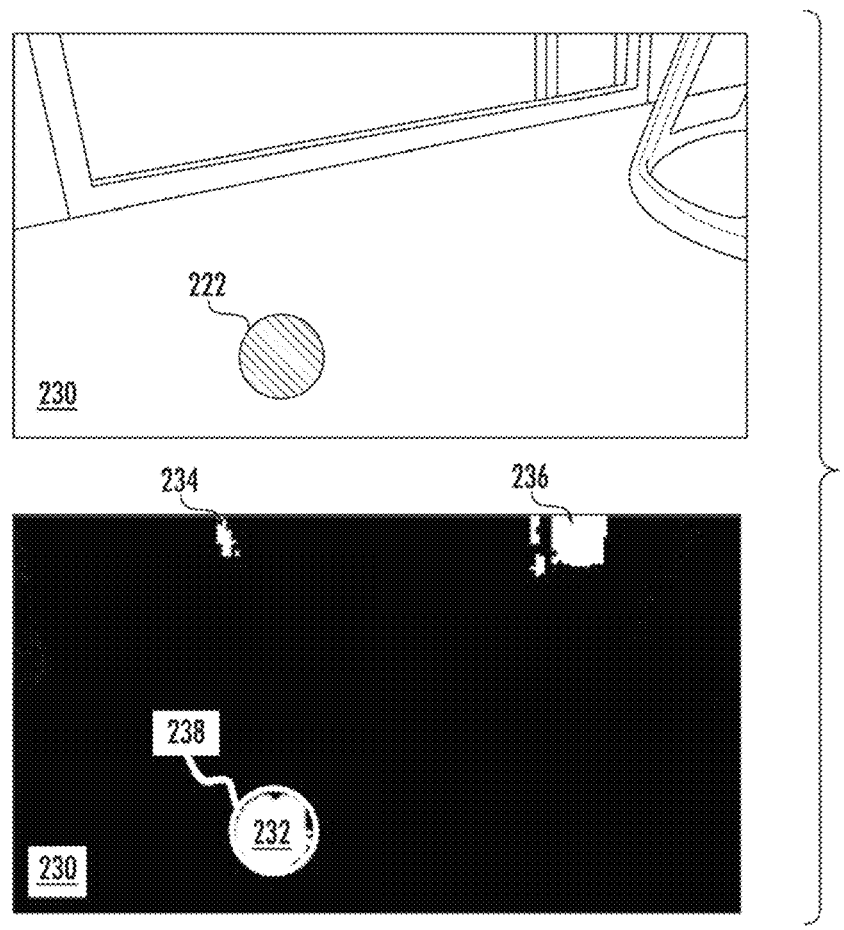
FIG. 2B illustrates saliency map comprising multiple salient areas determined based on pixel likelihood determination, according to one or more implementations.
Figure 11:
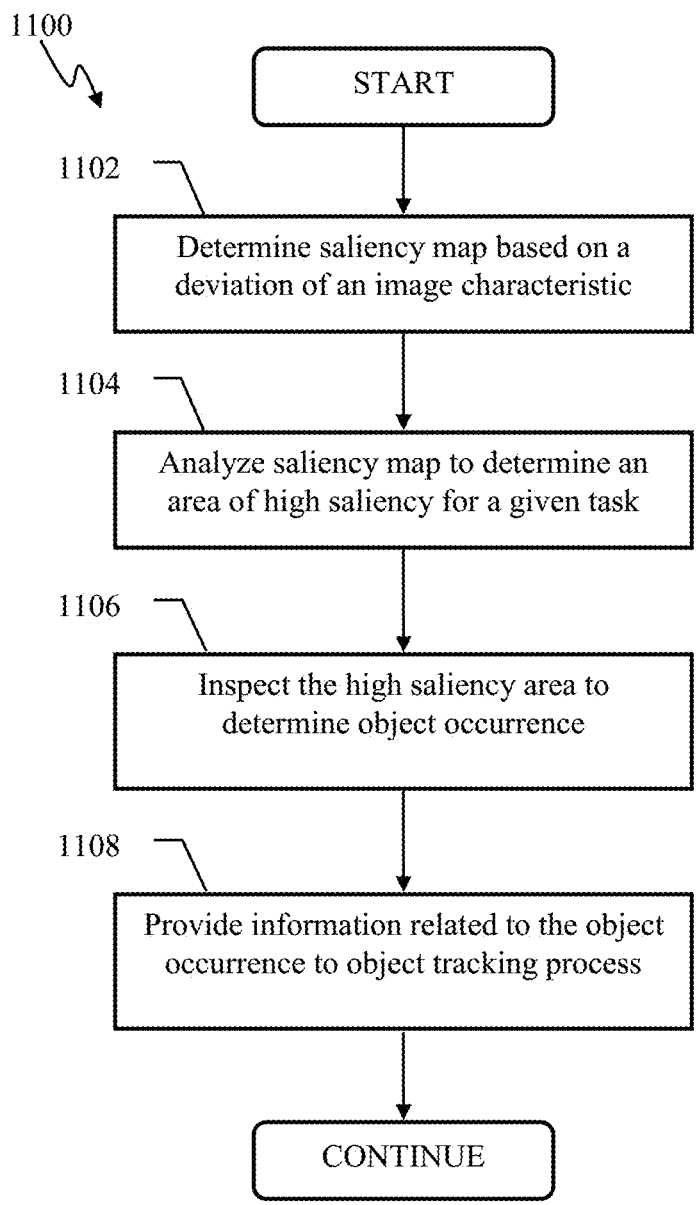
FIG. 11 is a logical flow diagram illustrating a method of data processing useful for determining features in an image, in accordance with one or more implementations.
Figure 12:
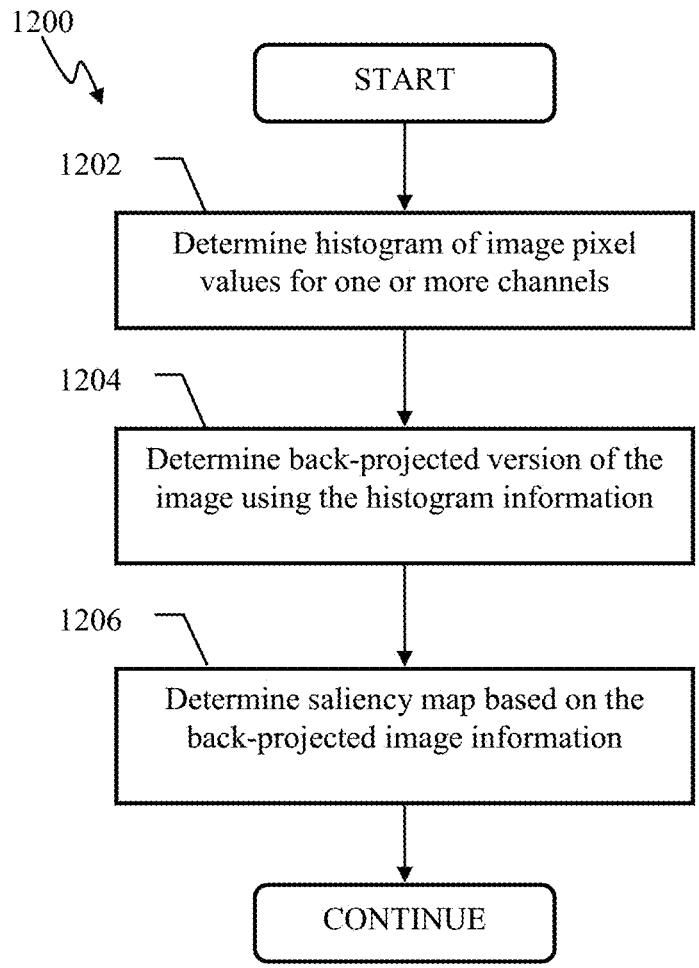
FIG. 12 is a logical flow diagram illustrating a method of determining a saliency map based on likelihood information, in accordance with one or more implementations.

In some implementations, the saliency determination may be realized by one or more of the operations described with respect to FIGS. 2A-2B, and/or FIGS. 11-12. Pixel likelihood may be characterized by pixel occurrence frequency, e.g., histogram of pixel values for an image. For a given image I, e.g., 200 in FIG. 2A, histogram H of pixel values may be determined. In some implementations of a single channel images (e.g., grayscale) the histogram may be determined using single channel values (e.g., intensity). In one or more implementations a multi-channel images (e.g., RGB, YUV, HSV, and/or other representations) the histogram may be determined for individual channels and or multiple channels.

Using the image histogram H, a back-projection matrix B may be determined. Dimensions of the matrix B may comprise dimensions of the original image I. In some implementations, the back-projection B may be determined as follows: individual pixel b(x,y) of the back-projected image may be assigned a value equal to the value (count) in the histogram for the pixel value i(x,y) of the original image I at the location (x,y):

$$B[x,y]=H(I[x,y])$$ (Eqn. 1)

By way of an illustration, if a pixel at location (1,1) in the original image is of value i(1,1)=0, and there are 1000 pixels with values of 0 in the image, the corresponding values b(1,1)=1000 in the back-projected image B. For a binned histogram implementation, a pixel with a value within a bin range may be assigned the bin count value.

A saliency metric S may be determined from the back-projection B. In some implementations, the saliency metric may comprise a matrix determined as follows:

$$S[x,y]=1/(B[x,y]+C)$$ (Eqn. 2)

where C denotes a parameter configured constant or dynamically adjustable. In one or more implementations, the saliency metric may be determined as:

$$S[x,y]=C-B[x,y]/f(B)$$ (Eqn. 3)

where f(B) may denote a norm operation. Other implementations may be utilized for a given level of target range and/or precision of saliency values.

In some implementations, determining a full histogram may be impractical, e.g., when pixels may comprise values in a very large space. For example, in 24 bit RGB (Red, Green, Blue) image may comprise 16.7 million possible pixel values. For most images every value of the image may correspond to a few (e.g., less than 1000 in some implementations) pixels. Determining the histogram for saliency in such case may be computationally taxing and/or may provide a weak signal, as the majority of pixels may be considered as salient (unique). To improve the dynamic range of such maps, binning may be used. That is, individual bins of the histogram do not correspond to a single value, but rather a range of values. The number of bins may be selected from the range between 2 and 10 per channel. For a 3-channel image (e.g., RGB, HSV or YUV) the total number of bins per image may be between 8 and 1024. A given bin may correspond to a range of values (e.g., [0 to 63] for bin 1 of 4-bins for 8-bit channel). Pixels with values falling within the bin range (or a bin with multiple ranges for a multi-channel histogram) may cause increment of the bin value (e.g., count).

Color spaces are often three dimensional. In these cases, the bins may correspond to cubes tiling the color space. In some implementations, the color space may be tiled uniformly in each direction (e.g., RGB color cube may be subdivided into 27 sub-cubes with individual sub-cube spanning ⅓ of individual dimension). In other color spaces (e.g., YCbCr, YUV, HSV, and/or other color spaces) where luminance may be represented separately from chrominance (color information), non-uniform binning may be employed. By way of an illustration, larger bins may be used to tile the luminance channel dimension; smaller bins may be used for chrominance channel dimensions. In some implementations, clipping the range for bins and/or dynamically placed bin edges may be used in order to enable control of the dynamic range of the saliency map for individual aspects (e.g., color channels) of the image. In some implementations, a single bin may be used for luminance channel with a plurality of bins for the chrominance channels. Saliency information derived from such implementations may be configured invariant to luminance changes.

FIG. 2A illustrates use of pixel likelihood information for detecting a feature in an image, according to one or more implementations. The image 200 in FIG. 2A may comprise an image obtained with a camera of a robotic device (e.g., 166 of 160 in FIG. 1) during navigation of a trajectory. In some implementations, the image 200 may comprise a previously recoded image that may be accessed from a storage medium (e.g., flash, optical, magnetic storage). Image 200 shown in FIG. 2A may comprise luminosity channel Y and two chromaticity channels U,V. The image 200 may comprise 320×240 pixels for Y channel, 160×120 pixels for each of U,V chromaticity channels. Pixel values for individual (YUV) channels may be characterized by 8-bit resolution thereby corresponding to pixel value range between 0 and 255. In some implementations, the image 200 may comprise an RGB color space image comprising 320× 240 pixels for individual red (R), green (G), and blue (B).

The image 200 may be characterized by a 3-dimensional color space (e.g., cube 206). The color space 206 may be partitioned into one or more bins, e.g., 256 bins in the implementation illustrated in FIG. 2A. Luminosity channel may be partitioned into 4 bins, U,V chromaticity channels may be partitioned into 8 bins each. Histogram of the image 200 may be determined as shown by arrow 202 in FIG. 2A. Pixels of the image 200 may be analyzed and assigned to one of the bins of the binned color space, thereby producing pixel likelihood distribution (the histogram). A back projection 210 of the likelihood information onto the image space may be determined (as shown by arrow 204 in FIG. 2A). In some implementations, the back projection determination may comprise, for a given location (x,y) in the image 210, assigning a value corresponding to value the histogram bin that corresponds to the pixel at that location (x,y) in the original image 200. In some implementations, the back projection 210 may be scaled to a given e.g., 8-bit range, using the following transformation:

$$B1(x,y)=256-B(x,y)/C$$

As may be seen in FIG. 2A, majority of the pixels in the back-projected image 210 are assigned a value corresponding to black color. A portion of pixels are assigned a value corresponding to gray color; a smaller portion of pixels (e.g., denoted by arrow 212 in FIG. 2A) are assigned value corresponding to white. The white area in the image 210 in FIG. 2A may be referred to as salient. Relating image 210 to the original image 200, white pixels in image 210 correspond to color of red hues (V>0 in YUV color model) in the image 200. Black pixels in the image 210 may correspond to green colors (V<1, U<0.5 in some implementations of YUV color model) in the image 200. In some implementations, salient area (e.g., 212 in image 210) may be determined based on occurrence of a plurality pixels with sufficient saliency (e.g., saliency greater than a given threshold of, e.g., 95%) proximate to one another. A plurality of proximate pixels may be amalgamated to produce a salient area. Number of the proximate pixels (salient pixel neighborhood) may be selected from a range that may correspond to 0.002% and 2% of a given image dimension. By way of an illustration, for an (x,y) image with x-dimension of 1000 pixels and y dimension of 2000 pixels, salient pixel neighborhood may correspond to between 2 pixels and 20 pixels in x-dimension and between 4 pixels and 40 pixels in y-dimension. Pixel saliency may be determined based on pixel likelihood be in a target range. In some implementations, the target range may be selected to correspond to between 5% and 0.01% least likely pixels in the image.

In some implementations, saliency map produced based on analysis of pixel value likelihood (e.g., using Eqn. 1) may comprise two or more areas of high saliency. FIG. 2 illustrates saliency map comprising multiple salient areas determined based on pixel likelihood determination, according to one or more implementations. Image 220 in FIG. 2B may be obtained by a robotic device (e.g., 160 in FIG. 1) during task execution. In some implementations, the image 220 may comprise 320×240 pixel matrix for luminosity Y channel, 160×120 pixel matrices for individual ones of U,V chromaticity channels. Pixel values for individual (YUV) channels of image 220 may be characterized by 8-bit resolution thereby corresponding to pixel value range between 0 and 255. Image 220 may comprise a target object (e.g., 222 in FIG. 2B).

Saliency map image 230 may be obtained using back-projection of the image 220 histogram determined using, e.g., 256 bins (4,8,8), respectively, of YUV color space. Areas corresponding to low pixel value occurrence likelihood (e.g., bin count in the histogram below 10%) may be identified as salient (e.g., areas 232, 234, 236 in FIG. 2B). Area corresponding to the target object of interest (e.g., the ball 222) may be determined. The target object area may be determined based on analysis of color distance, e.g., as described below with respect to FIG. 3, analysis of motion, circularity analysis (e.g., as described below with respect to FIG. 4), and/or other approaches.

In some implementations, saliency information may be determined based on analysis of difference between a value of a pixel and values of pixels in a surrounding region. In some implementations, an image I may be convolved with a low-pass kernel (e.g., a Gaussian kernel) to create a low-passed image F. In some implementations, wherein the image I may comprise 320 pixels by 200 pixel matrix with pixel density of Z pixels per mm, the low pass filter half power (e.g., 3 dB) dimensions may be selected between 7 and 50 pixels. It will be recognized by those skilled in the arts that various filter implementations (e.g., exponential, Chebyshev, Hamming) may be utilized with the saliency determination approaches described herein. In some implementations, filter x-dimension may be selected different from the y-dimension. Filter dimensions may be adjusted in accordance with operational task characteristics, e.g., image size, resolution, pixel density, potential target size, amount of noise in the image. By way of an illustration, a lower resolution/lower pixel count image may correspond to a smaller filter size when expressed in terms of pixels; higher resolution/greater pixel count image may correspond to a larger filter size when expressed in terms of pixels.

Saliency map S may be determined by assigning to individual pixels a distance measure between value of the pixel in the original image I and value of the pixel (at the same location) in the low-passed image F. In some implementations, the saliency map may be expressed as follows:

$$S[x,y]=d(F[x,y],I[x,y]), \qquad (Eqn. 4)$$

where F denotes the low passed version of the image I, and d( ) denotes a distance metric.

In some implementations, a pixel characterized by a greater distance (e.g., pixel having a value that is further than an average value of its surround) may be referred to as (more) salient, compared to pixels whose values may be closer to the average surround value. The distance metric d( ) may comprise a Euclidean distance (e.g., determined on the values of pixels), some form of rectilinear distance (e.g., sum of absolute values of differences between respective dimensions, e.g. Y, U, V values of the pixel). In some implementations, distance determination may be configured to emphasize or suppress one aspect (e.g., luminance) vs another aspect (e.g., chrominance). By way of an illustration, distance determination may be configured to utilize chrominance without using luminance.

In some implementations, saliency may be determined based on other aspects of the image, e.g., dominant orientation of features across an image. The orientation may be characterized by a set of parameters including one or more of angle, phase, frequency, contrast, and/or other parameters. An orientation map (also referred as feature orientation distribution) may be generated from the original input image whose pixel values may convey information related to orientation property (e.g., angle) of the original image. In some implementations, the orientation map may be determined based on convolving the initial image (e.g., 200 in FIG. 2) with a plurality of directional filters. Individual directional filters may comprise a spatial mask characterized by a preferred direction (e.g., 0°, 45°, 90° and/or other direction). The mask size may be selected between 3×3 pixels and 31 by 31 pixels when processing the image 200 comprising 320×200 pixels. Larger masks may be used when processing larger image sizes. In one or more implementations, the orientation map may be determined using local spatial frequency transformation (e.g. spatial Fourier transform over an area of an image). The orientation map may comprise values indicating most active filter (e.g., filter index with greatest convolution magnitude). The orientation distribution may be analyzed to produce saliency information by, e.g., using orientation likelihood, pixel distance and/or other approaches. In some implementations, orientation distribution may be configured based on an index of activated spatial filter (e.g., filter with predominantly vertical sensitivity may be assigned index value of 1, filter with predominantly horizontal sensitivity may be assigned index value of 3, and/or other index implementation). Analysis of the orientation distribution may comprise for example determining least frequently activated filter, e.g., by determining least frequently occurring index. In some implementations, the analysis may comprise sorting of the orientation map entries. Saliency information determined from the orientation map may reflect anomalies based on orientation aspects of group(s) of pixels the original image.

The saliency detection methodology described herein may be applied to a sequence of images. Saliency may be determined based on a difference (also referred to motion saliency) between consecutive images in the sequence. In some implementations, optical flow. e.g., a vector field representing direction and/or velocity of motion of pixels between successive frames, may be used for determining motion saliency. A variety of approaches may be used for estimating motion from a sequence of images. Motion information may be presented as a two dimensional motion vector map. The motion vector map may be regarded as an image; individual vector components (e.g., x motion y motion) may be regarded as image channels. Motion information may be processed in order to determine saliency using, e.g., methodology described herein. In some implementations, global/local statistical analysis along individual and/or a combination of individual motion channels (e.g., x-motion, y-motion, motion magnitude, motion direction, and/or other parameters) may be used for saliency determination. Analyses of motion information may reveal anomalies and/or indicate motion saliency.

In some implementations, wherein images may be obtained from a moving platform, majority of the motion may comprise motion along a particular direction (e.g., corresponding to the direction of motion of the camera). Such motion may be referred to as the background motion. An independently moving object may be perceived as salient. In some implementations, a robotic device may control its movements and/or observe the environment through a camera. Certain motor commands (e.g., forward, left-turn) may be associated with particular motion flow fields (e.g., left-turn command may generate a relatively uniform motion flow towards right). Observed features of the motion field may be used for saliency detection. By way of an illustration, for a given motor command (e.g., left turn), deviation from an expected motion field (e.g., predominant motion to the right) may comprise salient features. For example, if a robotic agent is moving forward, a motion field origination from the direction of motion and radially expanding towards the sides (looming) may be expected. A convergent portion of the motion flow field may indicate an object moving away from the robotic agent. Such object may be marked as salient in some implementations (e.g., when the agent is supposed to follow a moving target).

In some implementations (e.g., comprising distance to object measurement using LiDAR, ultrasonic range finder, stereo imager, structured light time of flight measurement, and/or other approaches), saliency information may be determined based on analysis of distance to objects (also referred to as depth. A object disposed at a distance that may differ from the rest of the scene may be referred as salient. Depth-derived saliency map may be utilized for navigation of autonomous flying drones for detection of obstacles.

Saliency may be used to identify the presence of objects in visual scene. In some implementations, additional information may be utilized for identifying object(s) of interest. Combining the saliency with object identity masks may allow for robust tracking, even in relatively complex conditions for object recognition. In some implementations, feature tracking and/or object tracking may comprise priming the tracking process by exposing an object of interest (e.g., ball) to the sensor (e.g., digital camera) configured to provide information to the tracking process. The priming may correspond to one or more digital images (priming images) that may be available to the tracking process. Saliency determination processing may be applied to the priming images in order to determine a salient feature within the one or more priming images. The tracking process may be configured to track the salient feature through one or more images subsequent to the priming image(s), the tracking configured based on an occurrence of a similarly salient feature in an image subsequent to the priming image. The saliency similarity may be configured based on a parameter used for determining the salient feature in the priming image(s). By way of an illustration, when pixel color may be used for determining salient feature in the priming image, subsequent images may be analyzed to determine saliency based on the pixel color; when color distance may be used for determining salient feature in the priming image, subsequent images may be analyzed to determine saliency based on the color distance color. Other parameters (e.g., orientation, circularity, shape, motion, color surface fill, physical distance, motion flow, locality, kinematic mask), a combination thereof and/or other parameters may be utilized for saliency determination, as described herein. In some implementations, tracking process may be provided with information related to motion of the sensor (e.g., the camera 166 of vehicle 160 in FIG. 1). Motion information may be utilized in order to adjust salient area location in accordance with camera motion (e.g., when panning, turning, and/or other maneuvers).

In some implementations, objects may be characterized by color. Color alone, however, may not be sufficient for feature tracking due to changes in absolute value of the object color due to, e.g., illumination changes, object orientation, and/or other causes. To illustrate, a red ball on an orange carpet may become brown when in shadow. In fact, the orange carpet may become red in the shadow. Relying only on absolute color value in this case may lead to substantial errors in object detection and/or tracking.

In some implementations, color information may be sufficient to distinguish between the object of interest and other salient objects (if present). By way of an illustration, the red ball may likely remain the most salient object whether in shadow or not. Among the salient objects detected on the floor, it may likely still be the reddest. A tracking method comprising color saliency evaluation may lead to much better tracking performance, compared to methods that to not employ saliency.

Figure 3:
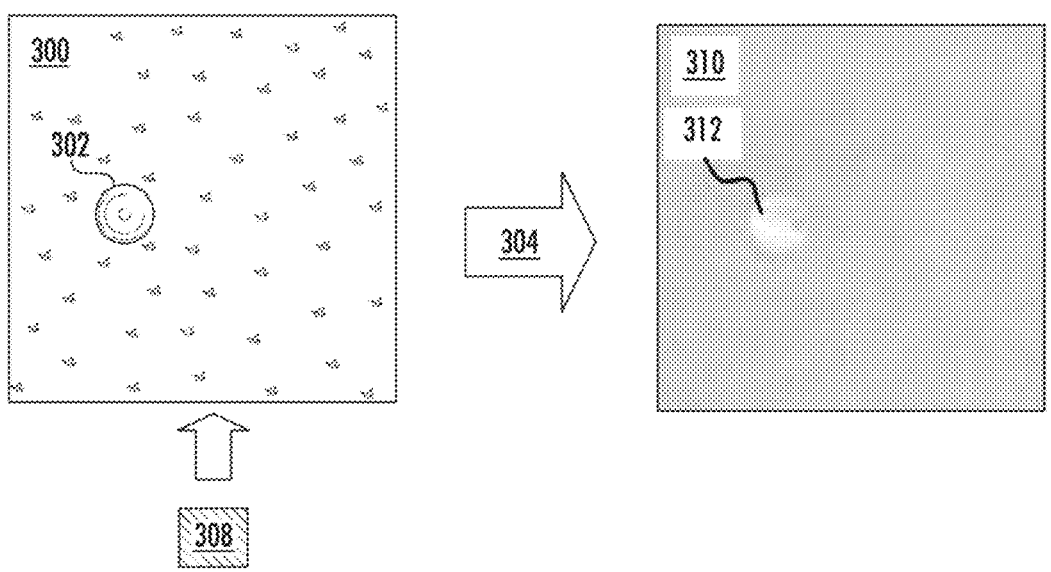
FIG. 3 illustrates use of color distance for determining a salient feature in an image frame shown in FIG. 2A, according to one or more implementations.

In some implementations, color distance may be used for determining silent objects. Color distance may be determined in a number of ways, depending on the image representation. In some implementations, Euclidean distance in the color space may be used. In one or more implementations, a rectilinear distance in a multi-dimensional color space may be used, e.g., as follows:

$$d(A,B)=\Sigma_{i=1}^{N}\alpha_i|A_i-B_i| \qquad \text{(Eqn. 5)}$$

where A, B denote images and/or image channels, and parameters a; denote weighs configured to emphasize and/or suppress given channel(s) over other channel(s), N denotes number of channels. By way of an illustration of analyzing an image configured in YUV color space, distance in the luminance channel may be taken with a smaller weight compared to the distance in the chrominance channels FIG. 3 is illustrates use of color distance for determining a salient feature in an image shown in FIG. 2A, according to one or more implementations. Distance data shown in FIG. 3 may be determined for example using a rectilinear (e.g., Manhattan) distance comprising a sum of absolute values of differences between components (e.g., YUV) of a given pixel and the reference pixel). Contribution of the luminance channels to the distance may be scaled, e.g., by a factor of 8. Individual channel contributions may be combined using 8-bit saturating addition, e.g., configured such that the sum may take maximum value of 255. By way of an illustration, sum of 140 and 115 may produce value of 255, while sum of 150 and 160 may produce value of 255. The image 300 in FIG. 2A may comprise features of a plurality of colors. Object 302 may correspond to an expected target for a given task (e.g., task of collecting orange balls, white golf balls, and/or other task). A reference color 308 may be used to determine color distance for pixels of the image 300. Color reference 308 may comprise a single pixel, or a matrix. In one or more implementations, the distance computation may be effectuated using Eqn. 5, wherein image A may comprise the image 302, image B may comprise the color reference 308. Image 310 in FIG. 3 depicts color distance image determined from the image 300 using Manhattan rectilinear distance determination. Weights $\alpha_i$ in Eqn. 5 may be configured as follows to obtain the image 310: luminosity channel weigh may be selected equal 0.125, U,V chromaticity channel weights may be selected equal 1.0. Area denoted 312 in FIG. 310 may correspond to lowest distance and denote object of interest. In some implementations, salient object detection may be improved by combining color pop-out mask (e.g., the image 210 in FIG. 2A) and the color distance mask (e.g., image 310 in FIG. 3). In one or more implementations, the combination may comprise a pixel-wise multiplication of matrices 210, 310.

Various approaches may be employed in order to determine the reference color (e.g., 308 in FIG. 3) used for color distance mask determination. In some implementations, e.g., such as illustrated in FIG. 3, the reference color may be determined as a prevailing (e.g., mean, median, and/or another statistical measure) color in area 212 corresponding to high saliency determined using color likelihood analysis, e.g., such as described herein. The reference color determined from, e.g., color mask 210 may be utilized for determining the color distance, e.g., presented in the image 310.

An object may comprise one or more color surfaces (i.e., areas of similar color and reflectance). A color surface may be salient when it is sufficiently distinct from the background and/or surrounding surfaces. In some implementations, determining a pixel and/or a group of pixels with the highest value of color saliency may be used for identifying salient color surface. In some implementations, determining spatial extent (mask) of the salient color surface may be used for determining a statistical parameter of colors (and/or reflectance) in the salient color surface. The statistical parameter may be used for determining of the color distance between the most salient color surface and the other ones, and/or to better track the salient object as it moves in the environment. For example, the mask of the most salient color surface may be used for choosing the color prototype used in the color distance. In some implementations, the statistical parameter may comprise prevailing color (e.g., median), least frequently occurring color (e.g., below 1% to 5%), and/or other parameter.

In some implementations, the mask of the most salient color surface may provide information related to an apparent size of the salient object, and/or a relative distance to the salient object. By way of an illustration, when the area of the color surface increases, it may be more likely that the object becomes closer to the viewer, or becomes less occluded by other objects.

In order to determine the mask extent (the region of the visual field) occupied by the most salient color surface, the following algorithm may be used, according to some implementations. Location of the high saliency area in saliency map (e.g., area of low likelihood (e.g., less than 10%) pixels of a given minimum size (e.g., 100 pixels) in FIG. 2A) may be determined. In one or more implementations, the saliency map may be determined based on color saliency (e.g., image 210 in FIG. 2A), or determined by multiplicatively combining multiple saliency maps as described below. In some implementations, saliency map may be blurred, e.g., by using Gaussian blur filter. In order to determine location of the salient area (target object), a threshold may be applied to the saliency map. In one or more implementations, the threshold may comprise a pre-determined value in sample space (e.g., pixels with occurrence count below 2000 may be deemed as silent; a pre-determined derived value (e.g., least frequently occurring 1% of pixels may be deemed as silent), and/or other threshold approaches. In some implementations, the threshold level may be determined dynamically based on analysis of one or more preceding images. In one or more implementations, the threshold may be configured to maximize classification success rate and/or ratio (e.g., percent correct ratio of true positives to false positives, and/or other classification performance metrics). In some implementations, the threshold may be configured based on an evaluation of pixel distribution (e.g., shape of the histogram). In one or more implementations, the threshold may be defined as a function of the skewness of the pixel distribution (e.g., histogram). The threshold may be configured based on a percentile of the distribution, and/or a combination of max( ) operation of a given value and a percentile, and/or yet other factors. In some implementations, the max( ) operation may be configured to produce an output determined as a maximum value of a sample comprising (i) a given value (e.g., 1,000,000 pixel counts) and (ii) a percentile value corresponding to the histogram (e.g., 99% value equal 950,000 pixel counts in some implementations). Location of the target may be expressed as a Boolean mask.

In some dynamic saliency threshold implementations, the saliency threshold may be gradually decreased below the peak value, to produce an increasingly large contour around the saliency peak. The threshold lowering may be terminated when the chroma range within the contour exceeds a pre-determined numerical value minmax_UV. In YUV color coordinates, the chroma range may, for example, be defined as max(max(U)−min(U), max(V)−min(V)). In YUV coordinates, where U and V may be between 0 and 255, the allowed minmax_UV may have values between 20 and 40. Larger minmax_UV values may allow for a greater color variance within a color surface; that is, the algorithm may be more likely to treat adjacent areas of similar chroma as one color surface rather than as distinct color surfaces.

Tracked objects may be characterized by shape. In some implementations, object circularity analysis may be employed for target detection. Circular shapes may be characterized by symmetries and rotational invariances. In some implementations, detection of circular shapes may be based on Hough moments. In one or more implementations circularity analysis may comprise the following operations:

- obtain a saliency e.g., using a color pop-out map 210 in FIG. 2A, or via threshold on the color distance (e.g., 310 in FIG. 3), or combination thereof), threshold the saliency map;
- apply threshold to the saliency to obtain outlines of potential objects;
- determine one or more contours of the potential objects using output of the threshold operation;
- for individual contour, determine the smallest enclosing circle, using, e.g., opencv library, described in http://docs.opencv.org/modules/features2d/doc/common_interfaces_of_feature_detectors.html?highlight=circularity, the foregoing being incorporated herein by reference in its entirety;
- determine a ratio between the area of the contour and the area of the smallest enclosing circle (this ratio may be referred to as the circularity ratio r); and
- apply a transformation to the circularity ratio to obtain a circularity parameter cp; in some implementations, the transformation may comprise a power operation (e.g., $r^2$); such transformation may be used to control the dynamic range of the circle detection. By way of an illustration, squaring the circularity ratio r may reduce circularity parameter for less circular shapes (e.g., wherein cp<1) thereby facilitating circular shape detection.

Object circularity analysis may be utilized for determining a saliency map as follows:

- an empty circularity map H may be provided (e.g., an array initialized with default values, of e.g., 0);
- determine a plurality of contours using thresholding of a saliency map (determined using any applicable methodology including these described herein);
- for individual contours, determine circularity parameter;
- sort contours in an increasing order with respect to the circularity parameter; and
- for every contour in the original heat map, draw the smallest enclosing circle of that contour on heat map H. Alternatively draw the contour itself on the heat map H. The intensity of the fill of the drawn circle (contour) should be proportional to the circularity parameter.

Figure 4:
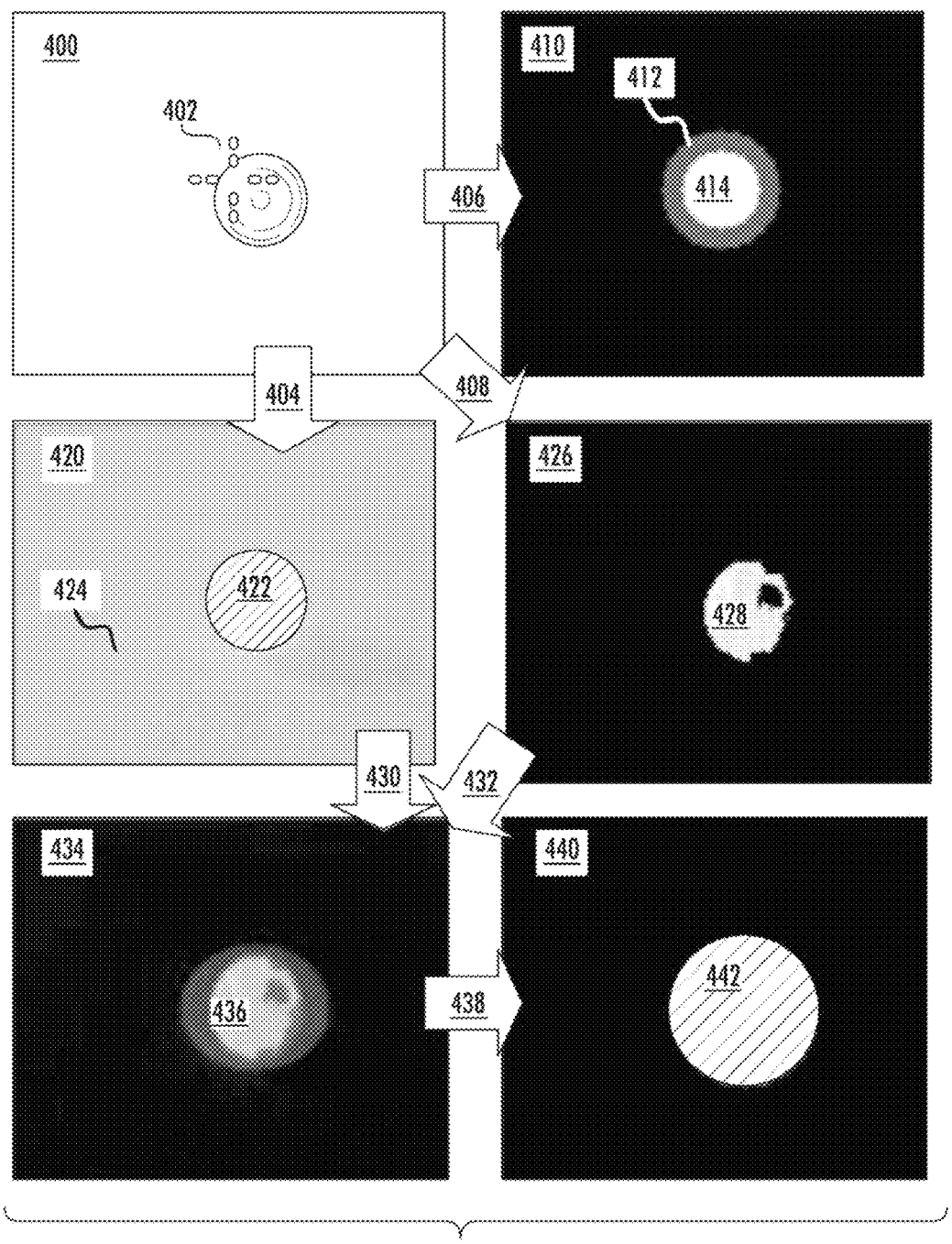
FIG. 4 illustrates saliency maps obtained using a plurality of image characteristics, according to one or more implementations.

FIG. 4 illustrates an exemplary circular object detection process, comprising determination of feature circularity, according to one or more implementations. Operations described with respect to FIG. 4 may be performed when tracking a ball 174 in FIG. 1 with a robotic vehicle (e.g., 160 in FIG. 1). Image 400 may correspond to an image obtained with a camera of the vehicle. Image 400 may comprise 320 by 200 pixels configured using YUV color space and collected at 25 frames per second. The image 400 may be obtained using, e.g., a CMOS sensor comprising 1.5 μm generation pixels disposed on a die measuring 4.8 mm×6.1 mm (29.3 mm2). The sensor output may be down-sampled to a lower resolution (e.g., 320×200) for processing. Images 400 may be processed online (e.g., in real time) or stored for off-line processing. It will be appreciated by those skilled in the arts that above image configuration represents an exemplary implementation, and other image configurations may be realized (e.g., with smaller or greater pixel count and/or pixel size), and/or other alterations. Furthermore, use of smaller pixel size and greater number of pixels may correspond to an object representation comprising greater number of pixels; use of greater pixel size and smaller number of pixels may correspond to an object representation comprising fewer pixels. Furthermore, pixel neighborhood dimensions may be adjusted accordingly with the pixel count and/or size when determining salient area in an image.

Image 410 may denote motion based saliency map determined from motion analysis (denoted by arrow 406) between two or more successive images (e.g., 400 and an image taken at another instance in time). Motion-based saliency may be configured based on confidence of motion estimation. Different shades in image 410 may denote motion detection confidence. e.g., white area 414 denoting 100%, black denoting 0%, and grey (e.g., 412) denoting an intermediate value, e.g., 0.67).

Image 410 may denote information obtained using a kinematic tracker process. By way of an illustration, area denoted by arrow 406 may denote a kinematic prior (e.g., corresponding to a location of an object at a prior time). The kinematic prior may be used to increase probability associated with object occurrence at that location in present image.

Image 420 may denote saliency map determined based on color distance determination, e.g., as described above with respect to FIG. 3. Hashed area 422 may correspond to lower values of color distance compared to area of solid fill (e.g. 424).

Image 426 may denote saliency map determined based on color likelihood analysis (denoted by arrow 408) of the image 402, e.g., color histogram as described above with respect to FIG. 2A. Hashed area 428 may correspond to lower values of occurrence (likelihood) of given color(s) compared to area filled with black.

Image 434 may denote saliency map determined based on a combination of the color distance map 420 and the color likelihood map 426. In some implementations, the combination may comprise a pixel-wise multiplication operation (denoted by arrows 430, 432) between masks 420, 426. Hashed area 436 may correspond to greater values of saliency compared to area of solid fill (e.g. 424).

Image 440 may denote saliency map determined based on contour circularity analysis of saliency map 434. In some implementations, the circularity analysis may comprise a threshold operation, determination of one or more contours, and determination of a ratio between contour area and the area of the corresponding minimal enclosing circle. Hashed area 442 in image 440 may denote area of high saliency In some implementations the identity of the tracked object may be estimated by tracking the motion of elements (features) of the object from its current position to a new position. Motion information may comprise noise component, particularly in complex environments wherein multiple moving objects may be present. Motion estimates obtained from successive image frames (e.g., between 2 and 4 at 25 fps) may provide accurate object position that may be used as prior information to identify the object of interest (particularly given a strong saliency map that filters out much of the background).

In systems equipped with depth sensors (e.g., structured light sensor for measuring time of flight, stereo camera for determining optical disparity, LiDAR sensor, RADAR, ultrasonic, and/or other sensor technologies capable of providing range to object) distance information may be utilized for detecting and/or tracking the object of interest. A given saliency map may comprise multiple areas of high saliency (e.g., as shown in image 230 in FIG. 2B) corresponding to one or more objects (e.g., 174, 176 in FIG. 1) and/or features. Individual features may be disposed at different distances from the sensor (e.g., distance between objects 174, 176 and the camera 166 in FIG. 1), and/or distance to features 236, 234 in FIG. 2B. For images obtained in close proximity to one another (e.g., 2 fps to 60 fps for a vehicle speed between 0.01 and 2 m/s) distance to a target object may be expected not to change substantially between successive images (e.g., for a relative speed of 1 m/s between a target and the camera, images acquired 0.1 s apart may be expected to produce object distance shift of about 0.1 m. Saliency map may be combined with the distance information and object may be discarded from the saliency map based on changes in distance that may exceed expected distance change range. Combining distance information with saliency information may simplify object tracking task and reduce number of false positives.

The combined saliency information (e.g., multiple saliency maps pertaining to different channels/modalities combined via additive or multiplicative or hybrid methodology, with additional maps detecting distinguishing features of the object, e.g. color)) may be used to provide object location in the image (e.g., location 402 in the image 400). This may also be referred to as object tracking or object tracker.

Objects and/or physical environment of the robot may be characterized by continuous behavior in time. Therefore, the tracked object may be unlikely to suddenly disappear from its current location and/or reappear at another location. Environment continuity may be exploited by assigning an identity signal close to the previous known location of the object. In some implementations, involving a kinematic mask, a motion estimate of the object may be determined based on two or more last known previous locations to give an estimate of the next location. A saliency map of expected object location may be provided, which may be integrated with other sources of information described herein.

Temporal continuity of object and/or environment between time instances $t_1$, $t_2$ may be utilized for constructing saliency map $S_2$ at time instance $t_2$ based on saliency map $S_1$ obtained at time instance t1. In some implementations the saliency map S1 may be combined via a convex combination with the newly obtained saliency map $S_2'$ to create the final map $S_2$. In some implementations, the final map S2 may be obtained as follows:

$$S_2 = \alpha S_2' + (1-\alpha) S_1.$$

Such methodology allows to mitigate certain transient noise (e.g. thermal camera noise) at a cost of providing lower signal in rapidly changing environments (where frame to frame true variability of the environment is large, e.g. in a very fast-moving robot).

In some implementations, histogram back projection may be used to provide evidence for the object tracker. As used herein the term tracker may be used to describe a process realized on a computer and/or other digital and/or analog hardware configured to produce, based on analysis of an image, a set of coordinates reflecting a position of an object in the image and/or object coordinates referenced to a sensing field of the image sensor (e.g., camera view field, sonar/radar sensing area.

A histogram of color channel (or multiple channels, or channels encoding other features than color) may be determined in the area where the object is present. In subsequent steps, a heat map may be generated by back-projecting the counts of the bins back into the pixel space (that is every pixel in the heat map is proportional to bin count to which the original pixel in the image belongs). In some implementations, the histogram back projection may be determined only on chromatic channels (containing color information) to make the method tolerant to luminance changes. In some implementations back projection may be performed independently for individual chromaticity (or other feature) channels. In some implementations, the resulting heat map may be obtained by additive, multiplicative, or hybrid integration (e.g., as described below).

In some implementations, spatial constraints may be provided as an input into the tracker. Use of prior spatial information may substantially (e.g., by eliminating 50% or more of false positives) improve tracking performance. For example, in some applications a given location within the sensing field (e.g. image in camera sensor implementations) may be characterized by frequent presence of objects other than the object of interest. These extraneous objects/features may also be referred to as distractors. The object of interest may rarely (relative to the distractors) appear at the given location. In such case, a prior spatial probability of appearance map may be determined and incorporated into the tracking process in order to reduce the likelihood of false object detection at the given location. In some implementations, the prior spatial map may be used to enhance object detection on one or more areas.

In some implementations, a pattern may exist in a spatial area where the object of interest may appear. Such pattern (e.g., green lawn) may be known in advance in some applications, while in some applications (e.g., location of a road in an image, location of vehicles of a given color in a mining pit) may not be known in advance. The tracking process may integrate information about where the objects were detected to enhance generate additional prior saliency map. Incorporation of the prior saliency map into object tracking process, may reduce the number of false positives in the area where the object of interest may be less likely to appear.

Some existing implementations of computer vision trackers use user input (e.g., via mouse/keyboard) in order to provide an initial target and/or target location (e.g., initial bounding box around the tracked object). Such approaches may not be well suited for autonomous operation, e.g., autonomous vehicles, and operating devices (e.g., robotic appliances) that may not be equipped with a screen and input device.

According to one or more implementations, object tracker of the disclosure may use the saliency mask in order to locate an object of interest. The saliency mask may be used to prime/initialize one or more object trackers. In some implementations, the uninitialized tracker may be configured to determine the saliency map using one or more approaches described herein (e.g., color saliency map). The uninitialized tracker may identify one or more candidate objects (salient areas) and select a target object. In some implementations, the target object may be selected based on largest area of given saliency (e.g. greater than 90%), and are containing highest saliency (peak area), are containing most saturated color, and/or a weighted combination of multiple selection criteria.

Once the initial target area is selected, additional tracker parameters may be configured. A color reference (e.g., 308 in FIG. 3) for color distance determination may be selected. In some implementations, one or more individual colors that may occur within the target area may be tested for discriminability of determining the target versus background using color. The discriminability may be determined using color distance above a given threshold. A given color from the target area which maximizes discriminability (e.g., greatest color distance to the background) may be selected as the reference color.

Further, once the reference color has been chosen, color distance threshold may be determined. In some implementations, a plurality of color distance maps may be determined for a plurality of reference color/threshold combinations. The color/threshold combination corresponding to greatest discriminability (e.g., greater cumulative over a given area color distance to a reverence color) may be selected.

A variety of approaches may be used for determining initial target area. In some implementations, a combination of colors and/or other features may be used. By way of an illustration, motion saliency map may be used to determine the initial target area. To facilitate motion based tracker initialization, the object of interest may be moved back and forth in front of the camera. In some implementations, a distance saliency map may be used to prime the tracker, in which case the object a substantially different distance (e.g., closer) than others may be selected. In some implementations, a weighted combination of a plurality of saliency masks may be used to select the most salient object for tracking.

In some implementations, the identity of the tracked salient object may be estimated via computation of color distance, between the pixels representing the salient object and a previously initialized color prototype.

In some implementations, the saliency mask representing a number of salient objects in the scene may be modified morphologically to connect close by components which are likely representing a single salient object (e.g. a colorful ball, obstructed by a black cable which subdivides the salient region into two close by regions). The amount of such morphological connection may be such that pixels closer than 2% of the larger image dimension will be connected.

A number of colors may be selected in order to track the identity of an object. In some implementations, a clustering algorithm may be employed to determine one or more colors (e.g., a set of colors) that may correspond to the object. In one or more implementations, individual colors for the color set may be selected based on a distance from a given color (e.g., most distant colors within a color space from the background). In some implementations, colors with saturation value above a threshold (e.g., greater than 70% saturation) may be selected. In some implementation, two or more color selection methods may be combined, e.g., the clustering technique may be applied to output of color saturation analysis and/or color distance analysis in order to determine colors for the set of colors used in tracking.

In some implementations, the color distance to multiple color prototypes may be computed for every contour (or a subset thereof) in the saliency mask. The likelihood that the salient object is that which should be tracked may be estimated as inversely proportional to the max( ) operation over minimal distances over the contour, for one or more colors in consideration:

$$P(c) \sim 1/d\text{max}; \quad d\text{max}=\text{max}(\text{min}(d_i)), \quad \text{(Eqn. 6)}$$

where $d_i$ is the color distance for a given pixel within the contour.

For example, if one of the distances to color prototypes for a given contour is larger than distances associated with other contours (e.g. such color is missing from the object), it may be picked by the max( ) operation and may lower the likelihood of the object detection for the given contour. By way of an illustration, object detection in contour C1 and contour C2 may be performed as follows. A minimum color distance d1 of pixels within the contour C1 to a reference color in 3-channel color space may comprise d1={10, 15, 12}; minimum color distance d2 of pixels within the contour C2 to the reference color in 3-channel color space may comprise d2={20, 10, 50}. Maximum operation applied to set d1 may produce a value of 15; maximum operation applied to set d2 may produce a value of 50. In accordance with Eqn. 6, likelihood of detection of the object in the contour C2 may be reduced relative likelihood of detecting the object in the contour C1. It will be recognized by those skilled in the arts that max( ) selection operation comprises one exemplary implementation. Other means of combining individual distances may be used consistent with the present disclosure, e.g. mean, median, Euclidean distance, L1 norm, or combinations of the foregoing.

In some implementations, a number of colors not belonging to the target may be acquired in the priming phase to provide negative evidence for object detection. In such case, the detection of one of those colors within the saliency area will decrease the likelihood of that area being determined as the object of interest.

In some implementations, the "negative" colors may be sampled randomly under the constraint of being as far as possible in the color space to positive colors examples (those detected on the priming object). In some implementations, the term positive color may be used to describe colors that may correspond to the object with high probability (e.g., greater than 90%). The term negative color may be used to describe colors that may be absent from the object with high probability (e.g., greater than 90%).

In some implementations, the negative colors may be selected from the background (non salient area of the priming image), to maximize discriminability between the object and the background.

In some implementations, a single parameter may be computed to indicate the distance to all the negative example colors. In some implementations, that parameter may be computed as the max of min, mean, median, Euclidean distance, L1 norm, and/or any combination thereof.

In some implementations, the negative evidence parameter may be subtracted from the positive evidence parameter to determine the likelihood of object detection. In other implementations, a set of logical statements and thresholds may be used to determine object detection likelihood. By way of an illustration, negative color information may be combined with the contour distance information as follows. A minimum color distance d1 of pixels within the contour C1 to a reference color in 3-channel color space may comprise d1={10, 15, 12}; minimum color distance d2 of pixels within the contour C2 to the reference color in 3-channel color space may comprise d2={20, 10, 50}. Distance to a color that is deemed as absent from the object (negative color) may be determined as 5 for the contour C1 and 100 for the contour C2. A difference operation may be used to combine the positive color distance and the negative color distance to determine likelihood of the object detection as follows:

$$P2(c) \sim \text{min}(d\text{max}^j - d\text{neg}^j); \quad d\text{max}=\text{max}(\text{min}(d_i)), \quad \text{(Eqn. 7)}$$

where $d\text{max}^j$ denotes largest of minimum color distances for contour j, and $d\text{neg}^j$ denotes smallest negative color distance for contour j.

The difference term of Eqn. 7, determined for contour C1 is 10, while difference term of Eqn. 7, determined for contour C1 is −50. According to Eqn. 7, the likelihood of the detecting the object at the contour C2 may be increased relative the likelihood of the detecting the object at the contour C1.

Figure 5:
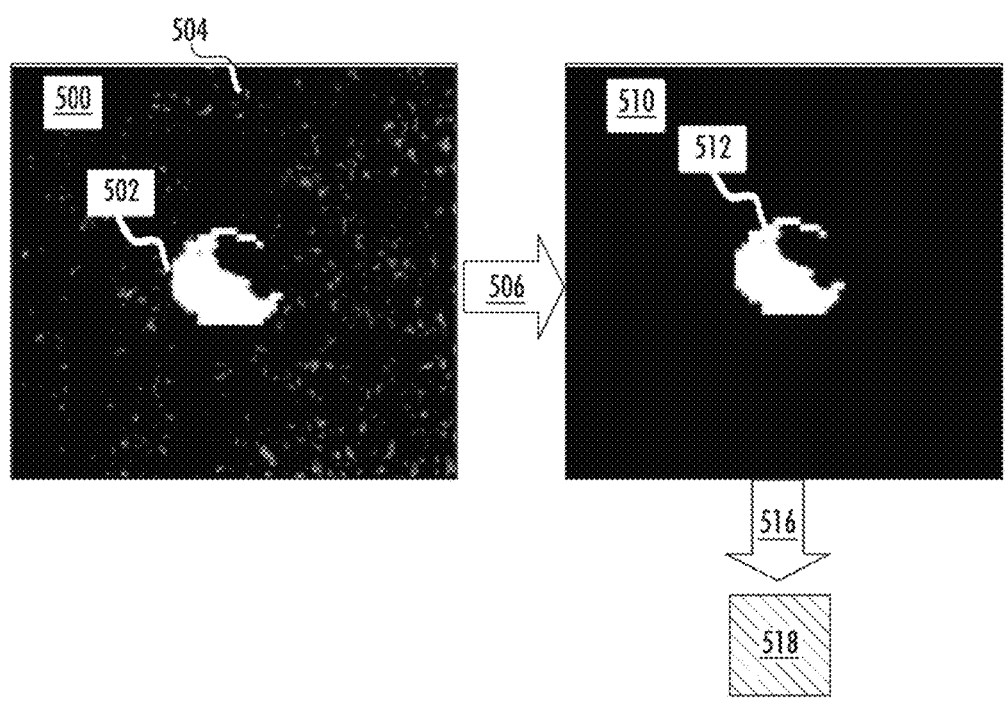
FIG. 5 illustrates use of a saliency map configured based on color likelihood as a priming map for detecting salient feature, according to one or more implementations.

FIG. 5 illustrates use of a saliency map configured based on color likelihood analysis of an image as the priming map for detecting salient feature, according to one or more implementations. Map 500 in FIG. 5 may be obtained based on analysis of likelihood of occurrence of pixel color in an image (e.g., image 200 in FIG. 2A). Map 500 may be obtained using histogram operations described above with respect to image 210 of FIG. 2A, in some implementations. Saliency may be configured inversely proportional to frequency of occurrence of a given color in the image 200. The map 500 may comprise one or more areas of high saliency (e.g., the area 502). The map 500 may comprise areas of intermediate saliency (e.g., the gray areas 504). In order to increase signal to noise ratio, and/or reduce probability of false detections, the map 500 may be spatially filtered in order to reduce and/or altogether remove smaller areas of low saliency. In some implementations, the filter may comprise a Gaussian 2-dimensional mask of 9×9 pixels for an image of 320×200 pixels. A threshold may be applied to the filtered map (or to the map 500 in some implementations) in order to remove areas of low saliency. In some implementations, the threshold may be configured to remove areas with saliency measure below 70%. As may be seen from map 510 in FIG. 5, the high saliency area (502 in map 510) is preserved through filtering/thresholding operations, while smaller areas of lower saliency (504 in map 500) are absent in the map 510 thereby improving reliability of detection of the salient area 512. The map 510 may be utilized for determining the reference color, which provides greatest distinguishability of the target object from the surrounding background.

Saliency maps (obtained using a variety of approaches) may be combined in order to improve detectability of an object/feature. Detectability improvement may be characterized by, e.g., a reduced number of false positives (e.g., an area deemed as silent that does not contain the target object) by the object detection process.

In some implementations, two or more saliency maps may be combined multiplicatively to produce a combined map representing the likelihood of presence of the object of interest. Individual maps $H_i$ may be characterized by a scalar parameter $c_i$ signifying the confidence of the respective map. Given confidence $c_i \in [0,1]$, saliency maps Si may be combined multiplicatively as follows:

$$C=\Pi_{i=1}^{n}[(1-c_i)+S_i c_i] \quad \text{(Eqn. 8)}$$

where $S_i(x,y) \in [0,1]$. In one or more implementations a saliency map characterized by low confidence (e.g., c=0) may contribute a constant equal to 1 in the product of Eqn. 8, therefore may not change the relative saliency of one area over another area in the resultant map C. A saliency map characterized by greater confidence (e.g., c=1) may contribute substantially to the resultant map C. In some implementations, a saliency map may be obtained as function of another saliency map. By way of an illustration, a map determined based on circularity analysis (e.g., as described above) may be obtained based on the color saliency map.

Figure 6:
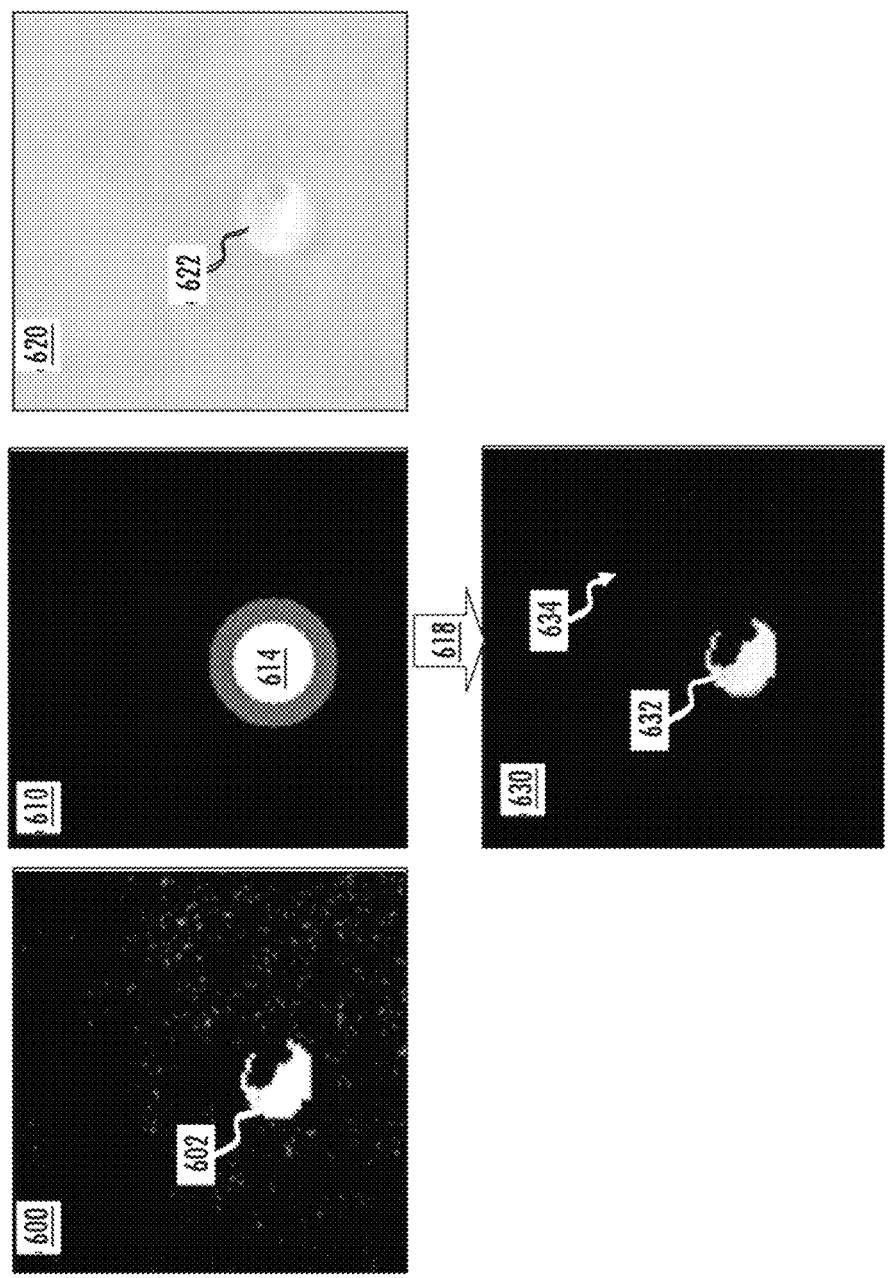
FIG. 6 illustrates use of multiple saliency maps for detecting a target object according to one or more implementations.

FIG. 6 illustrates use of multiplicative combination of multiple saliency maps for detecting a target object/feature according to one or more implementations. Individual saliency maps may be obtained using a variety of methods, including these described herein. Saliency maps 600, 610, 620 shown in FIG. 6 may be obtained using, e.g., pixel occurrence likelihood analysis (e.g., described with respect to FIG. 2A), using motion analysis (e.g., described with respect to map 410 of FIG. 4, and using color distance analysis, such as e.g., described with respect to map 310 of FIG. 3 above. The maps 600, 610, 620 may be combined multiplicatively, e.g., using formulation of Eqn. 8 depicted by arrow 618 in FIG. 6. The combined saliency map 630 may be characterized by an increased signal-to-noise (increased saliency) associated with the area comprising 632 the object of interest relative its surroundings (e.g., 634) compared to the saliency of the areas 602, 612, 622 in the maps 600, 610, 620, respectively.

In one or more implementations, saliency map C may be determined based on a weighted sum (e.g., weighted average) of two or more individual saliency maps $S_i$ as follows:

$$C=\Sigma_{i=1}^{n}\alpha_i S_i \quad \text{(Eqn. 9)}$$

where $\alpha_i$ denote weighting parameters.

In certain applications, a fusion of additive (e.g., of Eqn. 9) and multiplicative (Eqn. 8) saliency map combination techniques may be used. Certain saliency maps may provide capability to exclude certain locations in the image from being considered as containing the object. For example, if it may be known that the object of interest may more likely reside no farther than a given distance D from the device (e.g., the camera 166 in FIG. 1) a range-based saliency map, thresholded at the given distance D, may be integrated multiplicatively with other maps. Setting map locations (corresponding to ranges further than the distance D) within the distance-based saliency map to zero may be used to ensure that false positives that may arise in other methods of saliency analysis (e.g., based on color) may not bias the final saliency determination outcome. Such approach may be referred to as "veto" and/or a "filter out" operation.

In some implementations wherein evidence of presence/lack of feature may not be sufficiently high to exercise the veto operation (e.g., while the observed color may not be sufficiently close to the target object due to changes in illumination), the area in question may still be considered as a possible location of the target object, one or more saliency maps may be combined additively. In some implementations, the overall saliency determination approach may comprise a combination of additive and multiplicative approaches.

Output of saliency determination operation (e.g., combined saliency map) may be used to determine the target object location and/or bounding box for tracking the object. Various techniques and heuristics may be used in order to determine whether the tracker may still be following the object of interest. A bounding box may comprise the smallest rectangle enclosing the contour (area) where the object may be detected. Bounding box location (e.g., center coordinates) may be used by the tracking process to determine object location; bounding box dimensions may be used by the tracking process to determine object size. In some implementations, bounding box may be used for subsequent processing of images (e.g. by a machine learning system).

The bounding box may be determined in a variety of ways. In some implementations, a flood-fill on the color distance originating at the peak of the combined saliency map with a tolerance (e.g. referring to opencv documentations of flood fill http://docs.opencv.org/modules/imgproc/doc/miscellaneous_transformations.html, parameter loDiff=10) may be performed to estimate a connected component (an area in the image enclosed by a single contour) containing the peak of the combined saliency. The term "fill operation tolerance" may be used to describe image area fill operation wherein the fill process may assign given pixel values (e.g., given color) to pixels within an area until a difference across two neighboring pixels may be encountered that is greater than the tolerance.

Location and/or dimensions of the bounding box may be determined by determining the smallest enclosing rectangle of the connected component. In some implementations, the flood-fill may be determined on the saliency map determined based on analysis of color likelihood (e.g., 210 in FIG. 2A).

In some implementations, the flood-fill may be determined using a saliency map obtained based in two or more additively combined saliency maps Si using one or more image characteristics than one modality (for example color distance, color likelihood, and/or other characteristics). Individual maps Si may be thresholded prior to being combined. In some implementations, the connected component may be determined using the combined (multiplicative) saliency map. Such approach may enable tracking of objects that may not be characterized by a distinctive (salient) color compared to the background so that therefore the color distance alone may be providing a weak (e.g., below 50% of the maximal) saliency signal.

In some implementations, the tracked object may contain multiple colors. Presence of multiple colors in close vicinity to one another may simplify tracking. In some implementations, the initial area of interest as provided by the saliency map (pop-out mask) may be analyzed and a number of distant (in color space) color prototypes may be acquired. For individual color prototypes, a color distance mask may be determined for subsequent frames. For a given new frame, a set of candidate object locations may be established based on the saliency mask. For individual candidate regions, a set of minimal distances to the color prototypes may be determined. A logical analysis may be performed in order to determine an area that may produce the best match. In one instance the best match area may be selected based on color distances for a given area being within a given range (e.g., below a given threshold). In some cases, the color distance range may be configured individual color prototypes, e.g., being a function of color discriminability from the first (priming frame). In some implementations, a weighted sum of minimal color distances may be determined and compared to a threshold. In such case even if one of the colors from the prototype set may missing from the area of interest (large distance), the presence of other colors from the prototype set may cause the area to be selected as a possible location of the target.

In some cases multiple objects that may satisfy the tracking criteria may occur in an image. In one or more implementations, the tracking process may return positions and/or bounding boxes of all of the locations associated with these objects, may return the position of the largest region of interest; and/or may return the region closest to the previously identified object location. In some cases, the tracking process may produce a saliency describing positions and likelihoods of the target object appearing in the scene. In some implementations, such raw output may be forwarded to machine learning system; e.g., one trained to classify the presence of object of interest based on one or more factors such as e.g., pre-recorded and tagged set(s) of movies.

Figure 10:
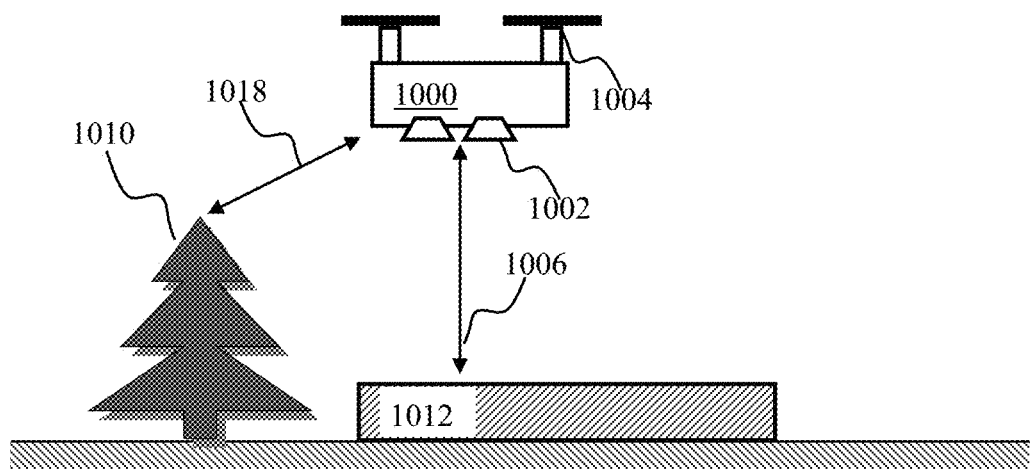
FIG. 10 illustrates use of saliency and/or object detection methodology by an unmanned robotic apparatus configured for autonomous navigation, in accordance with one or more implementations.

The output of the tracking process may be used to drive robotic device to execute a task (e.g., approach object 174 in FIG. 1 and/or land on the pad 1012 in FIG. 10). The output of the tracking process may be used as an input to a system configured to predict next motor action of a robot (referred to as predictor). Various ways of representing the tracker output may be used for that application, including, e.g., raw saliency map described below, normalized parameters of the bounding box.

In one or more implementations, the tracking process may be configured to determine if the object of interest may still present in a given image (e.g., 200 in FIG. 2A). If the determination indicates that the object may be present, the tracking process may communicate information related to the bounding box of the object in visual space coordinates. In some implementations, target object location (e.g., 402 in FIG. 4) referenced to the image may be combined with image sensor parameters (e.g., orientation in 3D, position) in order to determine bounding box location in visual space coordinates. If the object is absent, an object not found indication (e.g., a bounding box with negative coordinates and/or a null object) may be provided. Before entering the predictor (which for example maybe implemented a neural network having a plurality of input units) the tracker output may be converted to a form more suitable for subsequent processing. In some implementations, the actual bounding box may be converted to a saliency mask comprising zero values outside the box and values of one inside the box. Such mask may be passed through a preprocessing layer of neurons having spatial receptive fields covering the image space. Individual neurons may be configured to produce output configured based on the fraction of the receptive field occupied by the box (value one). A neuron which has only zero values in its receptive field may not produce output (activation zero). A neuron whose entire receptive field is occupied by the box (value one) may be fully activated. The vector of such activations projections onto receptive fields) may be provided as an input to the predictor. In some implementations, the center coordinates of the bounding box, together with its width and height may be provided as inputs to.

The predictor may comprise a learning process configured to determine associations between sensory context and action by the robot. In one or more implementations, the context may comprise one or more of robot state (e.g., location or motion information, (position, orientation, speed), platform state or configuration (e.g., manipulator size and/or position), available power and/or other), state of the environment (e.g., object size, location), environmental state (wind, rain), previous state information (e.g., based on historic states of robot motions), and/or other characteristic state information. In some implementations, the predictor may comprise an artificial neuron network configured to implement e.g., a perceptron, a random k-nearest neighbors classification process, a look up table learning process and/or other implementations, including e.g., such as described in U.S. patent application Ser. No. 14/607,018 entitled "APPARATUS AND METHODS FOR TRAINING PATH NAVIGATION BY ROBOTS", filed Jan. 27, 2015, Ser. No. 14/588,168 entitled "APPARATUS AND METHODS FOR TRAINING OF ROBOTS", filed Dec. 31, 2014, Ser. No. 14/244,890 entitled "APPARATUS AND METHODS FOR REMOTELY CONTROLLING ROBOTIC DEVICES", filed Apr. 3, 2014, Ser. No. 13/918,338 entitled "ROBOTIC TRAINING APPARATUS AND METHODS", filed Jun. 14, 2013, U.S. patent application Ser. No. 13/918, 298 entitled "HIERARCHICAL ROBOTIC CONTROLLER APPARATUS" filed Jun. 14, 2013, Ser. No. 13/907,734 entitled "ADAPTIVE ROBOTIC INTERFACE APPARATUS AND METHODS", filed May 31, 2013, Ser. No. 13/842,530 entitled "ADAPTIVE PREDICTOR APPARATUS AND METHODS", filed Mar. 15, 2013, Ser. No. 13/842,562 entitled "ADAPTIVE PREDICTOR APPARATUS AND METHODS FOR ROBOTIC CONTROL", filed Mar. 15, 2013, Ser. No. 13/842,616 entitled "ROBOTIC APPARATUS AND METHODS FOR DEVELOPING A HIERARCHY OF MOTOR PRIMITIVES", filed Mar. 15, 2013, Ser. No. 13/842,647 entitled "MULTICHANNEL ROBOTIC CONTROLLER APPARATUS AND METHODS", filed Mar. 15, 2013, and Ser. No. 13/842,583 entitled "APPARATUS AND METHODS FOR TRAINING OF ROBOTIC DEVICES", filed Mar. 15, 2013, each of the foregoing being incorporated herein by reference in its entirety.

In some implementations, process of determining as to whether the tracker may be following the object of interest may be incorporated in to the behavior prediction process. In this case the integrated system (robot together with behavior predicting process) may learn the behaviors relevant for the "tracked" object. In some instances a final heat map of object presence may be passed directly to the predictive system. In some implementations, the heat map may be passed through a preprocessing layer (e.g., as described in the paragraph above). In some implementations, the location of the peak of the heat map, together with the value at the peak and an estimate of the size of the peak at half of the maximal value, may be passed to the predictive system.

By avoiding the classification (decision if the object is tracked or not) the predictive process may take into account additional information not available to the tracker on whether the final saliency map may contain behaviorally relevant information. For example, the predictive process may learn to adjust the threshold for the detection based on one or more of the position/orientation of the robot, time of day, and/or other aspects that may be inaccessible to the tracker process.

Parts of the above described methodology may be applicable to a variety of signal modalities, e.g., in thermography, sonar data, radar data, and/or other applications. Saliency detection may be carried out in sonography, for example, by determining relevant histograms on the spectral representation of the time slice of sound.

Various computerized devices may be employed for implementing methodology described herein. One particular implementation of the computerized processing system, for use with the object detection, tracking, and/or control output generation methodology of the disclosure is illustrated in FIG. 7.

Figure 7:
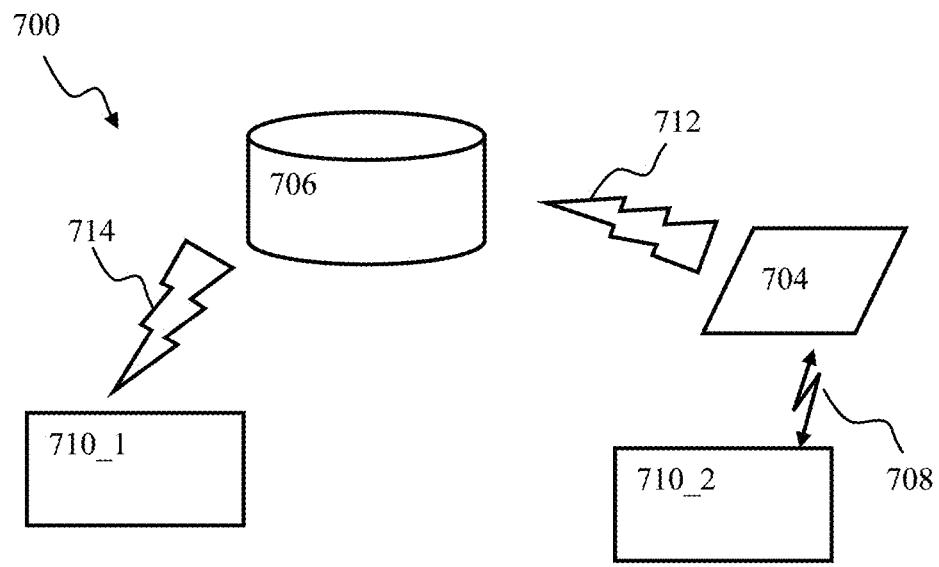
FIG. 7 is a functional block diagram depicting a system comprising salient feature detection apparatus, according to one or more implementations.

FIG. 7 illustrates a computerized system comprising a signal processing apparatus of the disclosure, in accordance with one implementation. The system 700 may comprise a computerized entity 706 configured to communicate with one or more signal processing devices 710 (e.g., 710_1, 710_2). In some implementations, the entity 706 may comprise a computing cloud entity (e.g., a cloud service, a server, in a public, private or hybrid network). In one or more implementations, the entity may comprise a computer server, a desktop, and/or another computing platform that may be accessible to a user of the controller 710. In some implementations of the cloud computing services, one or more signal processing devices 710 may communicate with the entity 706 in order to access computing resources (e.g., processing cycles and/or memory) in order to, e.g., detect features and/or objects in sensory data provided by, e.g., sensor module 172 of control system in FIG. 1. In some implementations, the signal processing devices 710 may communicate with the entity 706 in order to save, load, and/or update, their processing configuration (e.g., processing configuration 812 in FIG. 8). The configuration may comprise executable code (e.g., binary image files), bytecode, an array of weights for an artificial neuron network (ANN), and/or other computer formats. In some implementations, the signal processing device 710 may communicate with the entity 706 in order to save, and/or retrieve learned associations between sensory context and actions of a robot, e.g., as described in U.S. patent application Ser. No. 14/244,888, entitled "LEARNING APPARATUS AND METHODS FOR CONTROL OF ROBOTIC DEVICES VIA SPOOFING", filed Apr. 3, 2014, now issued as U.S. Pat. No. 9,630,317, and incorporated herein by reference in its entirety.

In FIG. 7, one or more signal processing devices (e.g., 710_1) may connect to the entity 706 via a remote link 714, e.g., Wi-Fi, and/or cellular data network. In some implementations, one or more signal processing device (e.g., 710_2) may connect to the entity 706 via a local computerized interface device 704 using a local link 708. In one or more implementations, the local link 708 may comprise a network (Ethernet), wireless link (e.g. Wi-Fi, Bluetooth, infrared, radio), serial bus link (e.g., USB, Firewire) and/or other. The local computerized interface device 704 may communicate with the cloud server entity 706 via link 712. In one or more implementations, links 712 and/or 714 may comprise an internet connection, and/or other network connection effectuated via any of the applicable wired and/or wireless technologies (e.g., Ethernet, Wi-Fi, LTE, CDMA, GSM, and/other).

In one or more applications that may require computational power in excess of that that may be provided by a processing module of the signal processing device 710_2 the local computerized interface device 704 may be used to perform computations associated with training and/or operation of the robotic body coupled to the signal processing device 710_2. The local computerized interface device 704 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware.

Figure 8:
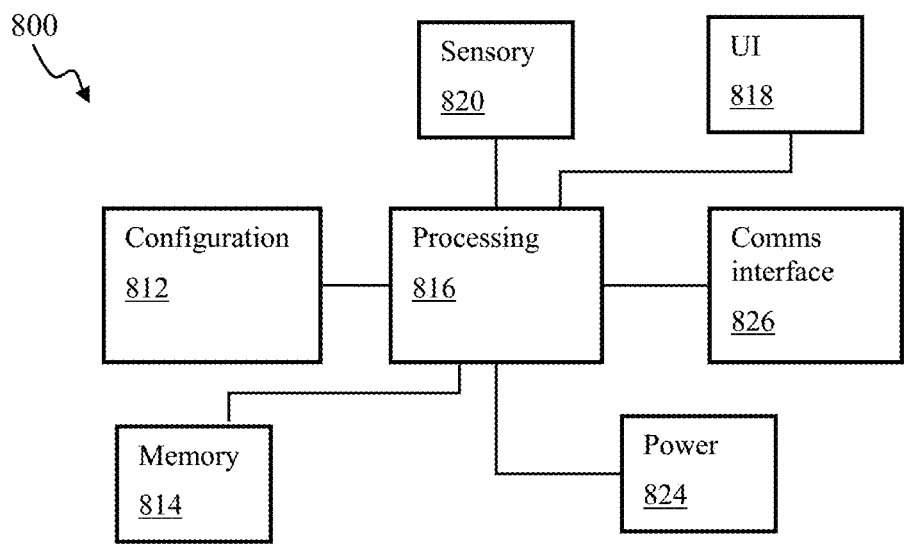
FIG. 8 is a functional block diagram depicting the salient feature detection apparatus of, e.g., FIG. 7, according to one or more implementations.

FIG. 8 is a functional block diagram detailing components of a signal processing device (e.g., 710 of FIG. 7) in accordance with one implementation. The apparatus 800 may comprise a memory component 812 configured to store a processing configuration and/or processing code. In one or more implementations, the processing configuration may comprise object color, size, shape, thresholds, weight coefficients, and/or other parameters. Additional memory 814 and processing capacity 816 is available for other hardware/firmware/software needs of the apparatus. The processing component 816 may interface to the sensory component 820 in order to obtain and process sensory data for, e.g., object detection, face tracking, stereo vision, and/or other tasks.

The processing component may interface with the mechanical 818, sensory 820, electrical 822, power 824, and user interface 818 components via driver interfaces and/or software abstraction layers. Additional processing and memory capacity may be used to support these processes. It will be appreciated that these components may be fully controlled by the robotic brain. The memory and processing capacity may aid in management of processing configuration (e.g., loading, replacement), operations during a startup, and/or other operations. Consistent with the present disclosure, the various components of the device may be remotely disposed from one another, and/or aggregated. For example, the learning configuration may be executed on a server apparatus, and control the mechanical components via network or radio connection while memory or storage capacity may be integrated into the brain. Multiple mechanical, sensory, or electrical units may be controlled be a learning apparatus via network/radio connectivity.

The mechanical components 818 may include virtually any type of device capable of motion or performance of a desired function or task. These may include, without limitation, motors, servos, pumps, hydraulics, pneumatics, stepper motors, rotational plates, micro-electro-mechanical devices (MEMS), electroactive polymers, and/or other mechanical components.

The user interface components 818 may comprise virtually any type of device capable of registering inputs from and/or communicating outputs to a user. These may include, without limitation, display, touch, proximity sensitive interface, light, sound receiving/emitting devices, wired/wireless input devices and/or other devices.

The sensory devices 820 may enable the processing apparatus to accept sensory input from external entities. These may include, without limitation, video, audio, capacitive, radio, vibrational, ultrasonic, infrared, and temperature sensors radar, lidar and/or sonar, and/or other sensory devices.

The electrical components 822 may include virtually any electrical device for interaction and manipulation of the outside world. This may include, without limitation, light/radiation generating devices (e.g. LEDs, IR sources, light bulbs, and/or other devices), audio devices, monitors/displays, switches, heaters, coolers, ultrasound transducers, lasers, and/or other electrical components. These devices may enable a wide array of applications for the robotic apparatus in industrial, hobbyist, building management, medical device, military/intelligence, and other fields (as discussed below).

The communications interface 826 may include one or more connections to external computerized devices to allow for, inter glia, management of the processing and/or robotic device, e.g., as described above with respect to FIG. 1 and/or with respect to FIG. 7. The connections may include any of the wireless or wireline interfaces discussed above, and further may include customized or proprietary connections for specific applications. In some implementations, the communications interface 826 may comprise a component (e.g., a dongle), comprising an infrared sensor, a radio frequency antenna, ultrasonic transducer, and/or other communications interfaces. In one or more implementation, the communications interface may comprise a local (e.g., Bluetooth, Wi-Fi) and/or broad range (e.g., cellular LTE) communications interface configured to enable communications between the processing apparatus (e.g., 710 in FIG. 7) and a remote computing entity (e.g., 706, 704 in FIG. 7).

The power system 824 may be tailored to the needs of the application of the device. For example, for a small-sized lower power appliance, a wireless power solution (e.g. battery, solar cell, inductive (contactless) power source, rectification, and/or other) may be appropriate. For building management applications, battery backup/direct wall power may be superior. In addition, in some implementations, the power system may be adaptable with respect to the training of the appliance apparatus (e.g., such as described in U.S. patent application Ser. No. 14/489,242, entitled "APPARATUS AND METHODS FOR REMOTELY CONTROLLING ROBOTIC DEVICES", filed Sep. 17, 2014 and incorporated herein by reference in its entirety). The training may improve operational efficiency of the appliance (to include power consumption efficiency) through learned management techniques specifically tailored to the tasks performed by the appliance apparatus.

FIGS. 9A-9D illustrate gestures of a human operator used for communicating control indications to a robotic device comprising feature determination apparatus described herein, in accordance with one or more implementations. The robotic device may comprise, e.g., the apparatus 160 comprising a camera 166. Objects and/or features shown in FIGS. 9A-9D may be obtained by a controller of the robot during operation using object/feature detection based on saliency analysis of video images provided by the camera.

Figure 9A:
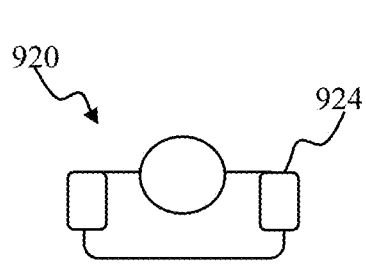
FIG. 9A-9D illustrates gestures of a human operator used for communicating control indications to a robotic device, gestures being detectable by a salient feature detection system of, e.g., FIGS. 6-7, in accordance with one or more implementations.
Figure 9B:
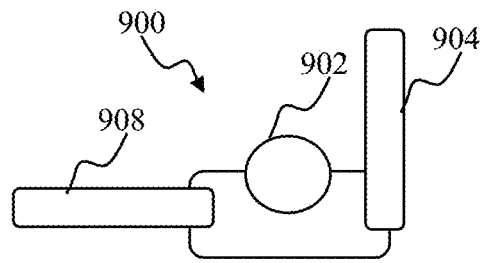

FIG. 9A is a top view of a user and may illustrate a base posture 920 of the user. FIG. 9B may depict user gestures 900 communicating a right turn action to a robotic device (e.g., the vehicle 160 in FIG. 1. The robotic device 160 may utilize images provided by the camera 166 in order to detect position of the user arms 908, 908. In some implementations, the arm 908, 904 position may be determined using saliency determination methodology configured based on color distance, color likelihood, distance, motion and/or other approaches described herein. By way of an illustration, the gesture in FIG. 9B may be determining based on a comparison of distance between the robot and the user antis in positions 604, 608 in FIG. 9B relative the user arms in position 924 in FIG. 9A. In one or more implementations, the gesture in FIG. 9B may be determining based on a comparison of distance between the robot and the user arms in positions 904, 908 relative the user head 902 in FIG. 9B.

Figure 9C:
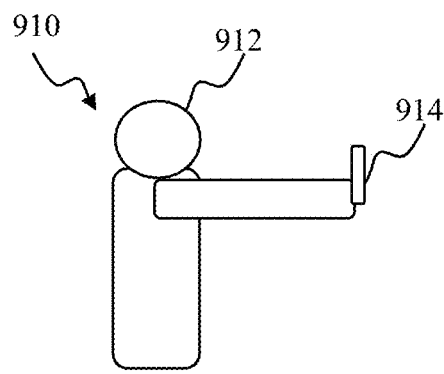
Figure 9D:
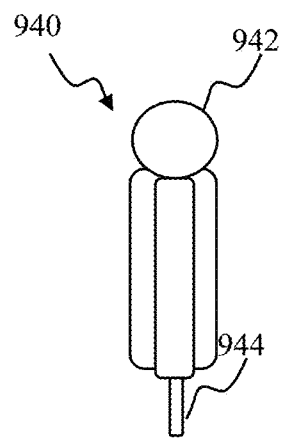

FIG. 9C is a side view of the user and may depict user gesture 910 communicating a stop action to a robotic device (e.g., the vehicle 160 in FIG. 1). A processing apparatus may utilize images provided by the camera 166 in order to detect position of the user arms, head 942, 912, and/or hands 914, 944. In some implementations, the hand 942, 944 position may be determined using the saliency determination methodology described herein. By way of an illustration, the gesture in FIG. 9C may be obtained based on a comparison of color between the robot and the user hands in position 914 in FIG. 9C relative the user hand in position 944 in FIG. 9D. In one or more implementations, the gesture in FIG. 9C may be determined based on a comparison of distance between the robot and the user hand in position 914 relative the user head 912 in FIG. 9C analysis of arm 914 motion, and/or other approaches. In some implementations (not shown) the user may communicate an indication to the robotic device by, e.g., appearing in view of the camera. By way of an illustrating, the user stepping in front of the vehicle may indicate to the vehicle a stop action.

FIG. 10 illustrates use of saliency and/or object detection methodology by an unmanned robotic apparatus configured for autonomous navigation, in accordance with one or more implementations.

The unmanned autonomous vehicle (AUV) 1000 may comprise one or more cameras 1002 disposed spatially from one another. Images provided by the camera 1002 may be analyzed using any applicable saliency detection methodology described herein (e.g., with respect to FIGS. 2A-6). The analysis may provide information related to presence and/or location of obstacles (e.g., the 1010 based on color distance saliency map), location of the landing pad 1012, and/or other objects. Controller of the device 1000 may utilize the saliency information and/or vehicle motion information to control actuators 1004 when landing, during take-off and or navigating around obstacles.

In some implementations, video streams provided by individual ones of the two or more cameras 1002 may be interleaved and encoded using, e.g., methodology described in U.S. patent application Ser. No. 14/326,374 entitled "APPARATUS AND METHODS FOR DISTANCE ESTIMATION USING STEREO IMAGERY", filed Jul. 8, 2014, the foregoing being incorporated herein by reference in its entirety. The encoding may enable controller of the vehicle 1000 to determine distance 1006 between the vehicle 1000 and the landing location 1012, and/or distance 1018 to obstacles (e.g., 1010). The controller may utilize the distance, the saliency information, and/or vehicle motion information to control actuators 1004 when landing, during take-off and or navigating around obstacles.

Figure 13:
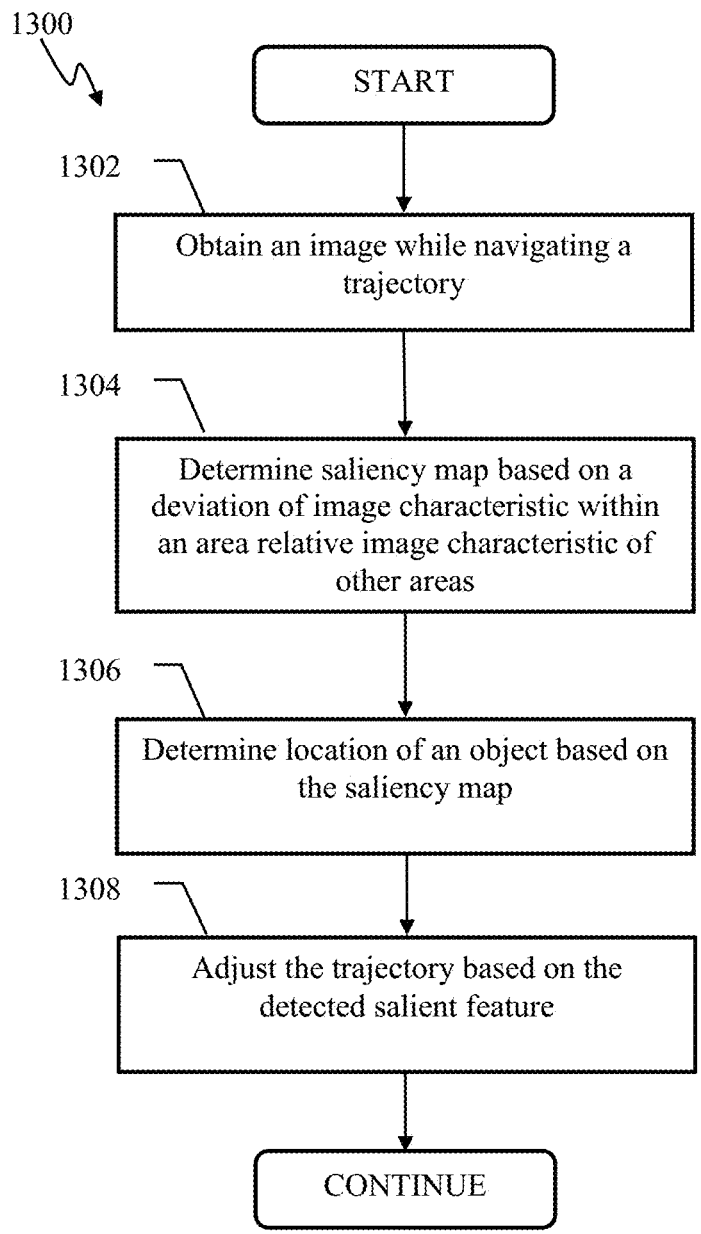
FIG. 13 is a logical flow diagram illustrating a method of trajectory navigation by a robotic device using salient feature detection, in accordance with one or more implementations.

FIGS. 11-13 illustrate exemplary methods of determining saliency in sensory input, according to one or more implementations of the disclosure. The operations of methods 1100, 1200, 1300 presented below are intended to be illustrative. In some implementations, methods 1100, 1200, 1300 may be accomplished with one or more additional operations not described, and/or without one or more of the operations discussed. Additionally, the order in which the operations of methods 1100, 1200, 1300 are illustrated in FIGS. 11-13 described below is not intended to be limiting.

Methods 1100, 1200, 1300 may be implemented in one or more processing devices (e.g., a digital processor, an analog processor, a digital circuit designed to process information, an analog circuit designed to process information, a state machine, and/or other mechanism for electronically processing information and/or configured to execute computer program modules stored as computer readable instructions). The one or more processing devices may include one or more devices executing some or all of the operations of methods 1100, 1200, 130 in response to instructions stored electronically on a non-transitory electronic storage medium. The one or more processing devices may include one or more devices configured through hardware, firmware, and/or software to be specifically designed for execution of one or more of the operations of methods 1100, 1200, 1300. The operations of methods 1200, 1220, 1240 may be implemented by a computerized apparatus (e.g., 710_1, 706, 800 in FIGS. 7-8) configured to control a robotic device (e.g., 160 in FIG. 1).

FIG. 11 illustrates a method of using saliency detection for tracking of objects, in accordance with one or more implementations.

At operation 1102 of method 1100 saliency map may be determined. Saliency map determination may be configured based on analysis of one or more characteristics of an image (e.g., the image 200 in FIG. 2A). The saliency map be configured based on a determination of a deviation of the characteristic in one portion of the image relative other portions. The characteristic may comprise pixel color for one or more channels (e.g., YUV), pixel color distance to a reference color, orientation of one or more groups of pixels, motion magnitude and/or direction for a group of pixels, and/or other characteristics. By way of an illustration, likelihood of pixel value occurrence in the image may be determined. Saliency of a pixel at a location within the saliency map may be determined based on the likelihood value pixel at that location. In some implementations, saliency map may comprise multiple components, e.g., map component determined based on likelihood, map component determined based on color distance, and/or other approaches.

At operation 1104 saliency map may be analyzed to determine an area of high saliency for a given task. Level of saliency considered high may be configured based on a specific task. By way of an illustration, in an application of locating a target object of a given color on a background, an area with color occurrence below 5% may be deemed as salient. In some implementations, the saliency map analysis may comprise determination of peak saliency, area around the peak a contour of a given level (e.g., threshold), largest contiguous area at or above given threshold; a contiguous area at or above given threshold, and/or other operations. Operation 1104 may produce one or more areas characterized by high saliency.

At operation 1106 one or more high saliency areas determined at operation 1104 may be analyzed. Analysis of a given salient area may comprise detecting presence of a particular color or set of colors, determining absence of a given color or a set of colors, presence or absence of features characterized by, e.g., high frequency content (e.g., edges), determining mean orientation, and/or other features. Operation 1106 may be configured to produce information related to presence of the object of interest in one or more areas of high saliency.

At operation 1108 information related to presence of the object of interest may be provided to a tracking process. In some implementations, the information may comprise object location, color, shape, bounding box size and/or location. Operation 1108 may be referred to as tracker priming wherein information about presence and/or location of an object obtained using one image characteristic (e.g., color distance) may be utilized to initialize and/or assist a tracking process configured to operate based on another characteristic (e.g., motion).

FIG. 12 illustrates a method of determining a saliency map based on likelihood information, in accordance with one or more implementations.

At operation 1202 of method 1200 a histogram of image pixel values may be determined for one or more channels of an image. In some implementations the image may comprise an image in YUV color space comprising 320×240 pixel matrix for Y luminosity channel, 160×120 pixel matrix for individual ones of the U,V chromaticity channels. Pixel values for individual (YUV) channels may be characterized by 8-bit resolution thereby corresponding to pixel value range between 0 and 255. The image may be characterized by a 3-dimensional color space (e.g., cube 206 in FIG. 2A). The color space may be partitioned into one or more bins, e.g., luminosity channel may be partitioned into 4 bins, U,V chromaticity channels may be partitioned into 8 bins each thereby producing 18 bins. In one or more implementations, number of bins within a color space may be selected between 2 and 200. Histogram determination may comprise comparison of individual pixel values within the image to individual bin ranges of the color space.

At operation 1204 a back-projected version of the image may be determined using the histogram information. In some implementations, the back-projection operation may comprise assigning a saliency value at a location (x,y) determined based on a value of the respective bin of the histogram the may correspond to pixel value within the original image at the location (x,y).

At operation 1206 saliency map may be determined based on the back-projected image information. Histogram bin values may convey information related to frequency of occurrence of a given pixel value within the image. Lower frequency of occurrence may correspond greater the saliency, in accordance with some implementations. In some implementations, saliency map determination may comprise one or more of spatial filtering (e.g., Gaussian blur), thresholding, and/or other operations configured to increase difference between an area of high saliency relative background (signal to noise) within the saliency map.

FIG. 13 illustrates a method of navigating a trajectory by a robotic device using salient feature detection, in accordance with one or more implementations. Operations of method 1300 may be performed by, e.g., autonomous robotic vehicle 160 of FIG. 1 when approaching a target 174, and/or vehicle 1000 when landing while avoiding an obstacle in FIG. 10 in one or more implementations.

At operation 1302 an image may be obtained by the robotic device while navigating a trajectory associated with a task. In some implementations, the image may comprise a plurality of pixels characterized by one or more channels (e.g., the image 200, 230 in FIGS. 2A-2B).

At operation 1304 saliency map may be determined based on determining a deviation of a characteristic within an area of the image relative the characteristic of other area(s). In one or more implementations, the deviation determination may comprise determination of color distance difference, analysis of difference between a value of a pixel and values of pixels in a surrounding region, analysis of pixel likelihood of occurrence, motion magnitude and/or direction, circularity, orientation of pixel patches, and/or other operations. In some implementations, the saliency map may be determined based on a combination (e.g., multiplicative, and/or additive) of two or more maps, e.g., as described above with respect to FIGS. 5-6.

At operation 1308 location of an object may be determined based on the saliency map evaluation. In some implementations, the evaluation may comprise determination of color, orientation, dimensions (e.g., circularity), surface area, motion direction and/or magnitude, and/or other parameters associated with the salient area.

At operation 1310 the trajectory may be adjusted based on the detected object feature. In some implementations, wherein the detected object may comprise a target (e.g., 174 in FIG. 1) the trajectory adjustment may be configured to guide the robotic device closer to the object. In some implementations, wherein the detected object may comprise an obstacle (e.g., 1010 in FIG. 10) the trajectory adjustment may be configured to guide the robotic device away from the object.

Implementations of the principles of the disclosure may be further applicable to a wide assortment of applications including computer-human interaction (e.g., recognition of gestures, voice, posture, face, and/or other interactions), controlling processes (e.g., processes associated with an industrial robot, autonomous and other vehicles, and/or other processes), augmented reality applications, access control (e.g., opening a door based on a gesture, opening an access way based on detection of an authorized person), detecting events (e.g., for visual surveillance or people or animal counting, tracking).

A video processing system of the disclosure may be implemented in a variety of ways such as, for example, a software library, an IP core configured for implementation in a programmable logic device (e.g., FPGA), an ASIC, a remote server, comprising a computer readable apparatus storing computer executable instructions configured to perform feature detection. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation may be combined with one or more features of any other implementation.

What is claimed is:

1. A robotic apparatus configured to track a target object comprising:
   a camera; and
   a non-transitory computer-readable medium having computer-readable instructions stored thereon, that when executed by at least one processor apparatus, configure the at least one processor apparatus to,
      obtain a plurality of images via the camera while navigating a trajectory associated with a physical task;
      identify a salient area in the plurality of images, the identification of the salient area being based at least on a contrast between (i) a relative motion associated with the target object and (ii) a relative motion associated with another object within a field of view of the camera, the target object being within the field of view, where the relative motion associated with the target object is determined from a combination of a motion component associated with a movement of the object and a motion component associated with the navigation of the trajectory of the robotic apparatus;
      initialize an object tracking process based at least on the identification of the salient area, the object tracking process comprising a detection of the object from the salient area; and
   adjust the trajectory associated with the physical task based on the detection of the object from the salient area.

2. A non-transitory computer-readable medium having computer readable instructions stored thereon, that when executed by at least one processor, configure the at least one processor to,
   determine a relative motion of an object in a sequence of one or more images when a robotic apparatus is in motion along a trajectory, the relative motion of the object being determined based on (i) determining a first motion component, (ii) determining a second motion component, and (iii) combining the first motion component and the second motion component, the first motion component being associated with the motion along the trajectory of the robotic apparatus, the second motion component being associated with a movement or an absence of the movement of the object, the object being located within a visual scene;
   identify a salient area in the sequence of one or more images based on the determined relative motion of the object, the salient area identified being based on determining a contrast between (i) the determined relative motion of the object and (ii) a relative motion of at least one other object within the visual scene, the relative motion of the at least one other object being based on the first motion component and a third motion component, the third motion component being associated with a movement or an absence of the movement of the at least one other object; and
   initialize an object tracking process based at least on the identifying of the salient area.

3. The non-transitory computer readable medium of claim 2, wherein the at least one processor is further configured to execute the computer readable instructions to reduce a number of occurrences of false positives associated with detecting the object in subsequent one or more images of the plurality of images when the object tracking process is initialized, as compared to detecting the object in the subsequent one or more images in absence of the initializing.

4. The non-transitory computer readable medium of claim 3, wherein,
the one or more images include individual pixels, the individual pixels characterized by pixel characteristics, and
the at least one processor is further configured to execute the computer readable instructions to determine a saliency distribution of pixels of the one or more images of the sequence of images based on at least one of the one or more pixel characteristics during identifying of the salient area.

5. The non-transitory computer readable medium of claim 4, wherein,
the one or more pixel characteristics comprises a pixel chromaticity parameter; and
the at least one processor is further configured to execute the computer readable instructions to determine a spatial distribution of pixel color distance in the one or more images when the saliency distribution is determined, the pixel color distance being determined based at least on a distance measure between the chromaticity parameter of individual pixels of the one or more images and a reference chromaticity.

6. The non-transitory computer readable medium of claim 5, wherein the reference chromaticity is determined based at least on determining a pixel chromaticity occurrence statistics parameter.

7. The non-transitory computer readable medium of claim 5, wherein the identification of the salient area in the one or more images comprises causing the at least one processor to execute the computer readable instructions to,
determine that one or more values of the spatial distribution of pixel color distance breach a threshold; and
determine a thresholded pixel distance map based at least on determining a location of one or more pixels within the one or more images, the location corresponding to the one or more values of the spatial distribution of pixel color distance.

8. The non-transitory computer readable medium of claim 7, wherein the identification of the salient area in an image further comprises, the at least one processor is further configured to execute the computer readable instructions to,
determine a low-pass filtered version of the thresholded pixel distance map; and
determine a shape parameter associated with at least a portion of the low-pass filtered version.

9. The non-transitory computer readable medium of claim 8, wherein the identification of the salient area in the image further comprises causing the at least one processor to execute the computer readable instructions to,
determine one or more contours associated with one or more contiguous pixel groups within the low pass filtered version; and
for a given contour of the one or more individual contours, the at least one processor is further configured to execute the computer readable instructions to,
determine a smallest enclosing circle; and
determine a circularity based at least on a ratio between an area of the given contour and an area of the smallest enclosing circle.

10. The non-transitory computer readable medium of claim 9, wherein the at least portion of the low-pass filtered version is selected based at least on an evaluation of a greatest contiguous number of pixels.

11. The non-transitory computer readable medium of claim 8, wherein the at least portion of the low-pass filtered version is selected based at least on a greatest cumulative saliency value, the value determined by accumulating a plurality of saliency values.

12. The non-transitory computer readable medium of claim 3, wherein the identification of the salient area in the one or more images comprises causing the at least one processor to execute the computer readable instructions to,
partition the image into a plurality of partitions, individual ones of the plurality of partitions comprising a plurality of adjacent pixels in a contiguous area;
convolve individual ones of the plurality of partitions with one or more spatial filter masks to produce a plurality of convolution magnitudes, individual ones of the one or more spatial filters characterized by filter orientation; and
determine the salient area corresponding to a least frequently occurring filter convolution magnitude above a threshold.

13. The non-transitory computer readable medium of claim 3, wherein the salient area is identified based at least on analysis of displacement of pixels of the one or more images relative to pixels of a preceding image of the sequence of images.

14. The non-transitory computer readable medium of claim 13, wherein:
the analysis of displacement comprises causing the at least one processor to execute the computer readable instructions to,
determine a motion map of pixels of the one or more images, the motion map at least characterizing magnitude and direction of motion of pixels in the one or more images associated with representation of the object; and
determine the saliency map based at least on an additional information related to motion of the object.

15. The non-transitory computer readable medium of claim 14, wherein the additional information is obtained during a tracker priming operation, the operation comprising the at least one processor is further configured to execute the computer readable instructions to analyze a plurality of images characterizing motion of the object, the priming operation comprising motion of the object in a given pattern and in absence of other sources motion in individual ones of the plurality of images.

16. The non-transitory computer readable medium of claim 3, wherein:
the one or more images of the sequence of images are obtained by a sensor configured to sample energy reflected from an environment;
individual pixels of the one or more images are characterized by a range channel corresponding to a range value between the sensor and a location within the environment; and
the salient area is determined based at least on information related to a given range to the object and a comparison of range channel value associated with pixels in the salient area to the range to the object.

17. The non-transitory computer readable medium of claim 4, wherein:
the one or more images are characterized by a color space comprising at least one dimension; and
the pixel characteristics are configured to convey information related to the at least one dimension.

18. The non-transitory computer readable medium of claim 17, wherein:

the salient area is characterized by a first pixel occurrence;

the saliency distribution comprises a background portion characterized by a second pixel occurrence, the second occurrence being greater than the first occurrence; and the first pixel occurrence is configured to provide a reference within the color space.

19. The non-transitory computer readable medium of claim 18, wherein:

the at least one dimension comprises a chromaticity dimension; and the reference comprises a reference chromaticity.

20. The non-transitory computer readable medium of claim 19, wherein the at least one processor is further configured to execute the computer readable instructions to determine the reference chromaticity based on a distribution of pixel chromaticity occurrence within the one or more images.

21. The non-transitory computer readable medium of claim 20, wherein the at least one processor is further configured to execute the computer readable instructions to determine a difference measure between chromaticity of individual pixels within the one or more images and the reference chromaticity; and the determination of the reference chromaticity based on the pixel chromaticity occurrence is configured to increase a discriminability between a distance measure associated with pixels corresponding to the salient area of the one or more images and a distance measure corresponding to the background portion of the one or more images.

22. The non-transitory computer readable medium of claim 21, wherein the increased discriminability is configured based on a greater difference between (i) the distance measure associated with pixels corresponding to the salient area of the one or more images, and (ii) a distance measure corresponding to the background portion of the one or more images when compared to respective distance measures determined based on another reference chromaticity, the another reference chromacity determined based at least on pixels disposed outside the salient area of the one or more images.

* * * * *